US008073061B2

(12) United States Patent
Horiuchi et al.

(10) Patent No.: US 8,073,061 B2
(45) Date of Patent: Dec. 6, 2011

(54) RADIO COMMUNICATION APPARATUS AND RADIO COMMUNICATION METHOD

(75) Inventors: Ayako Horiuchi, Kanagawa (JP); Akihiko Nishio, Kanagawa (JP)

(73) Assignee: Panasonic Corporation, Osaka (JP)

(*) Notice: Subject to any disclaimer, the term of this patent is extended or adjusted under 35 U.S.C. 154(b) by 632 days.

(21) Appl. No.: 11/576,133

(22) PCT Filed: Sep. 29, 2005

(86) PCT No.: PCT/JP2005/018019
§ 371 (c)(1),
(2), (4) Date: Mar. 27, 2007

(87) PCT Pub. No.: WO2006/035902
PCT Pub. Date: Apr. 6, 2006

(65) Prior Publication Data
US 2008/0063097 A1    Mar. 13, 2008

(30) Foreign Application Priority Data
Sep. 29, 2004  (JP) ................................. 2004-285468

(51) Int. Cl.
*H04K 1/10*   (2006.01)
*H04L 27/28*  (2006.01)
*H04L 27/00*  (2006.01)
(52) U.S. Cl. .............................. 375/260; 327/1; 375/259
(58) Field of Classification Search .................. 370/208, 370/328, 335; 375/259, 260; 455/60
See application file for complete search history.

(56) References Cited

U.S. PATENT DOCUMENTS

| 5,809,398 | A | 9/1998 | Moberg | |
|---|---|---|---|---|
| 2001/0018336 | A1 | 8/2001 | Okajima et al. | |
| 2002/0193070 | A1* | 12/2002 | Kitagawa et al. | 455/17 |
| 2003/0185179 | A1* | 10/2003 | Inogai et al. | 370/335 |
| 2003/0214919 | A1 | 11/2003 | Kilfoyle | |
| 2005/0002325 | A1* | 1/2005 | Giannakis et al. | 370/208 |
| 2005/0025253 | A1* | 2/2005 | Sakoda | 375/260 |
| 2005/0220200 | A1* | 10/2005 | Giannakis et al. | 375/260 |
| 2006/0018250 | A1* | 1/2006 | Gu et al. | 370/208 |
| 2006/0089102 | A1* | 4/2006 | Nishio et al. | 455/67.11 |
| 2006/0116078 | A1 | 6/2006 | Miyoshi | |
| 2006/0215603 | A1* | 9/2006 | Nishio et al. | 370/329 |

(Continued)

FOREIGN PATENT DOCUMENTS

JP  11098104  4/1999

(Continued)

OTHER PUBLICATIONS

PCT International Search Report dated Dec. 27, 2005.

(Continued)

*Primary Examiner* — Kevin M. Burd
*Assistant Examiner* — Erin File
(74) *Attorney, Agent, or Firm* — Dickinson Wright PLLC

(57) ABSTRACT

There is provided a radio communication device capable of suppressing increase of power consumption of a relay station device. In this device, a channel information extraction unit (31) extracts channel information (channel information in the mobile station device of the signal transmitted from the base station device) from the reception signal from a base station device; a sub carrier selection unit (32) selects a sub carrier of low received quality according to the channel information; a relay data extraction unit (33) extracts data to be relay-transmitted according to the selection result in the sub carrier selection unit (32); and a sub carrier allocation unit (35) allocates data to be relay-transmitted to the sub carrier for relay transmission.

9 Claims, 29 Drawing Sheets

U.S. PATENT DOCUMENTS

| | | | |
|---|---|---|---|
| 2006/0245390 A1* | 11/2006 | Omoto et al. | 370/328 |
| 2007/0071119 A1* | 3/2007 | Davydov et al. | 375/260 |
| 2007/0195897 A1* | 8/2007 | Cheng et al. | 375/260 |
| 2007/0202904 A1* | 8/2007 | Cheng et al. | 455/509 |
| 2008/0168114 A1* | 7/2008 | Han et al. | 708/209 |
| 2008/0233901 A1* | 9/2008 | Ebiko et al. | 455/114.2 |

FOREIGN PATENT DOCUMENTS

| | | |
|---|---|---|
| JP | 2001 189971 | 7/2001 |
| JP | 2002 152158 | 5/2002 |
| JP | 2003 298496 | 10/2003 |
| JP | 2004 015746 | 1/2004 |
| RU | 2142200 | 11/1999 |
| SU | 1667265 | 7/1991 |
| WO | 2004/059891 | 7/2004 |

OTHER PUBLICATIONS

Office Action on the corresponding Russian Patent Application dated Oct. 23, 2009, with English translation.

Supplementary European Search Report dated Aug. 22, 2011.

* cited by examiner

RADIO COMMUNICATION APPARATUS AND RADIO COMMUNICATION METHOD

TECHNICAL FIELD

The present invention relates to a radio communication apparatus and radio communication method, and more particularly, to a radio communication apparatus and radio communication method in a communication network which employs multicarrier transmission such as OFDM (Orthogonal Frequency Division Multiplex) scheme or the like.

BACKGROUND ART

Recently, with the multimediatization of information in mobile communication systems as represented by mobile phones or the like, it is becoming popular to transmit not only audio data, but also large amounts of still picture data, motion picture data and the like. To realize the transmission of large amounts of data, an approach is being broadly investigated according to which a high-frequency radio band is used to obtain a high-transmission rate.

However, in the case of using a high-frequency radio band, while a high transmission rate can be expected at a short distance, attenuation due to transmission distance is significant. For this reason, in the case of expanding this to a real system, for instance, the coverage area of a base station becomes small, which requires that a larger number of base stations to be provided. Since the set-up of base stations involves large costs, a technology is strongly required for realizing communication services while suppressing an increase in the number of base stations.

As a conventional technology related to this, there exists the technology described in Patent Document 1, for example. In the conventional technology of this Patent Document 1, a communication network of cellular-dedicated radio channels which are formed between a base station and a mobile station, and an ad-hoc network formed between mobile stations are both used to combine signals, whereby an improvement of the diversity effect is obtained.

1 Patent Document 1: Japanese Patent Application Laid-Open No. 2001-189971

DISCLOSURE OF INVENTION

Problems to be Solved by the Invention

However, in the conventional technology described in Patent Document 1, since the mobile stations forming the ad-hoc network carry out an processing of relaying to other mobile stations, while carrying out the required processings locally, a problem existed that the amount of power consumption increases.

It is therefore an object of the present invention to provide a radio communication apparatus and a radio communication method capable of suppressing an increase in the power consumption of a radio communication apparatus that carries out a relay.

Means for Solving the Problem

In accordance with one aspect of the invention, the radio communication apparatus of the present invention adopts a configuration that includes: a receiving section that receives a first multicarrier signal comprised of a plurality of subcarriers, from a first radio communication apparatus; a subcarrier selection section that selects part of the plurality of subcarriers; an extraction section that extracts, from the first multicarrier signal, a subcarrier signal allocated to the part of the plurality subcarriers, in accordance with a selection result in the subcarrier selection section; and a transmission section that transmits a second multicarrier signal including the subcarrier signal, to a second radio communication apparatus.

According to the above configuration, the multicarrier signal transmitted from the first radio communication apparatus can be selected for each subcarrier and relayed, and therefore, the amount of transmission data is reduced compared to the case that all subcarriers are relayed, which makes it possible to reduce the transmission power of the radio communication apparatus that carries out relay-transmission.

ADVANTAGEOUS EFFECT OF THE INVENTION

This invention makes it possible to suppress an increase in the power consumption of a radio communication apparatus that carries out relay-transmission.

BEST MODE FOR CARRYING OUT THE INVENTION

Now, embodiments of the present invention will be described in detail with reference to the accompanying drawings. A radio communication apparatus to be described hereinafter is a radio communication apparatus that transmits a multicarrier signal received from a first radio communication apparatus to a second radio communication apparatus, and is adapted for installation in a radio relay station apparatus, for example, to be used in a mobile communication system.

Hereinafter, the radio communication apparatus of the present invention is described as a relay station apparatus, the first radio communication apparatus as a base station apparatus and the second radio communication apparatus as a mobile station apparatus.

Embodiment 1

Figure 1:
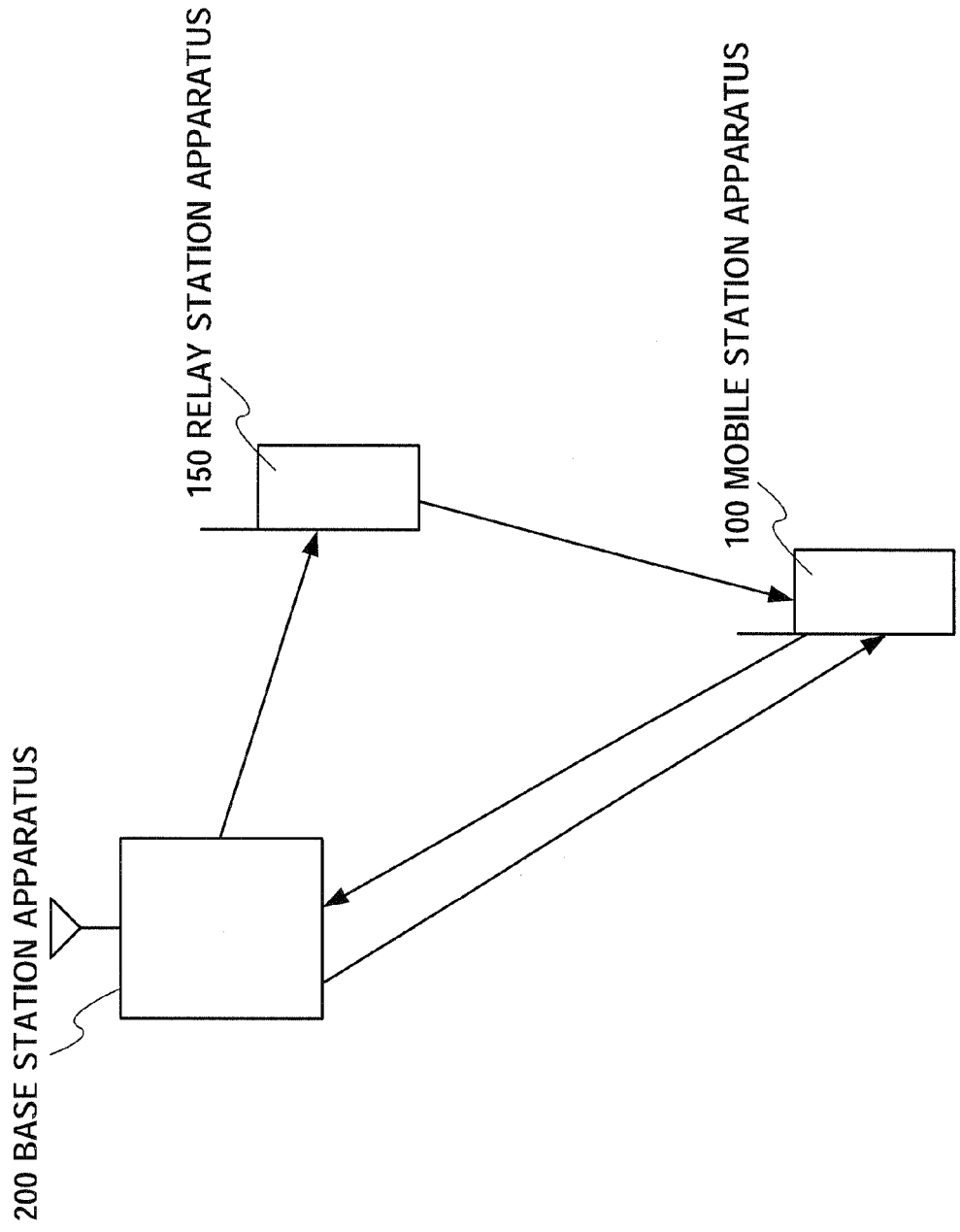
FIG. 1 is a configuration diagram showing a mobile communication system according to embodiment 1.

As shown in FIG. 1, the mobile communication system according to the present embodiment is comprised of a mobile station apparatus 100, a relay station apparatus 150 and a base station apparatus 200.

Base station apparatus 200 instructs in advance relay station apparatus 150 to relay a signal to mobile station apparatus 100. Also, base station apparatus 200 holds corresponding information of the identification information for mobile station apparatus 100 and relay station apparatus 150, and relay station apparatus 150 holds identification information of mobile station apparatus 100, which is the object of relaying. Also, the identification information of relay station apparatus 150 may also be held in mobile station apparatus 100.

Next, the overall processing will be described using the sequence diagram shown in FIG. 2.

Base station apparatus 200 transmits a multicarrier signal to mobile station apparatus 100 and relay station apparatus 150 (processings (1) and (2)) Mobile station apparatus 100 generates channel information assigning a level to the received quality, for each subcarrier constituting the multicarrier signal received from base station apparatus 200. The present embodiment shows an example where received intensity level is used as received quality. Next, mobile station apparatus 100 reports the generated channel information to base station apparatus 200 (processing (3)). Base station apparatus 200 reports the reported channel information to relay station apparatus 150, before relay station apparatus 150 transmits relay data to mobile station apparatus 100 (processing (4)). In accordance with the reported channel information, relay station apparatus 150 selects, from the multicarrier signal received from base station apparatus 200, a subcarrier having lower received quality than a predetermined level, extracts a subcarrier signal corresponding to the subcarrier selected from the multicarrier signal addressed to mobile station apparatus 100 and received in processing (2), and relay-transmits it to mobile station apparatus 100 as multicarrier signal (processing (5)).

Next, examples showing the received intensity level of a received signal received at mobile station apparatus 100 and relay station apparatus 150 are shown in FIGS. 3A to 3D. In FIGS. 3A to 3D, the numerical symbols 1 to 8 on the horizontal axis show subcarrier numbers, an example where the multicarrier signal is comprised of subcarriers 1 to 8. The same symbols are used in the following embodiments, as well.

Figure 2:
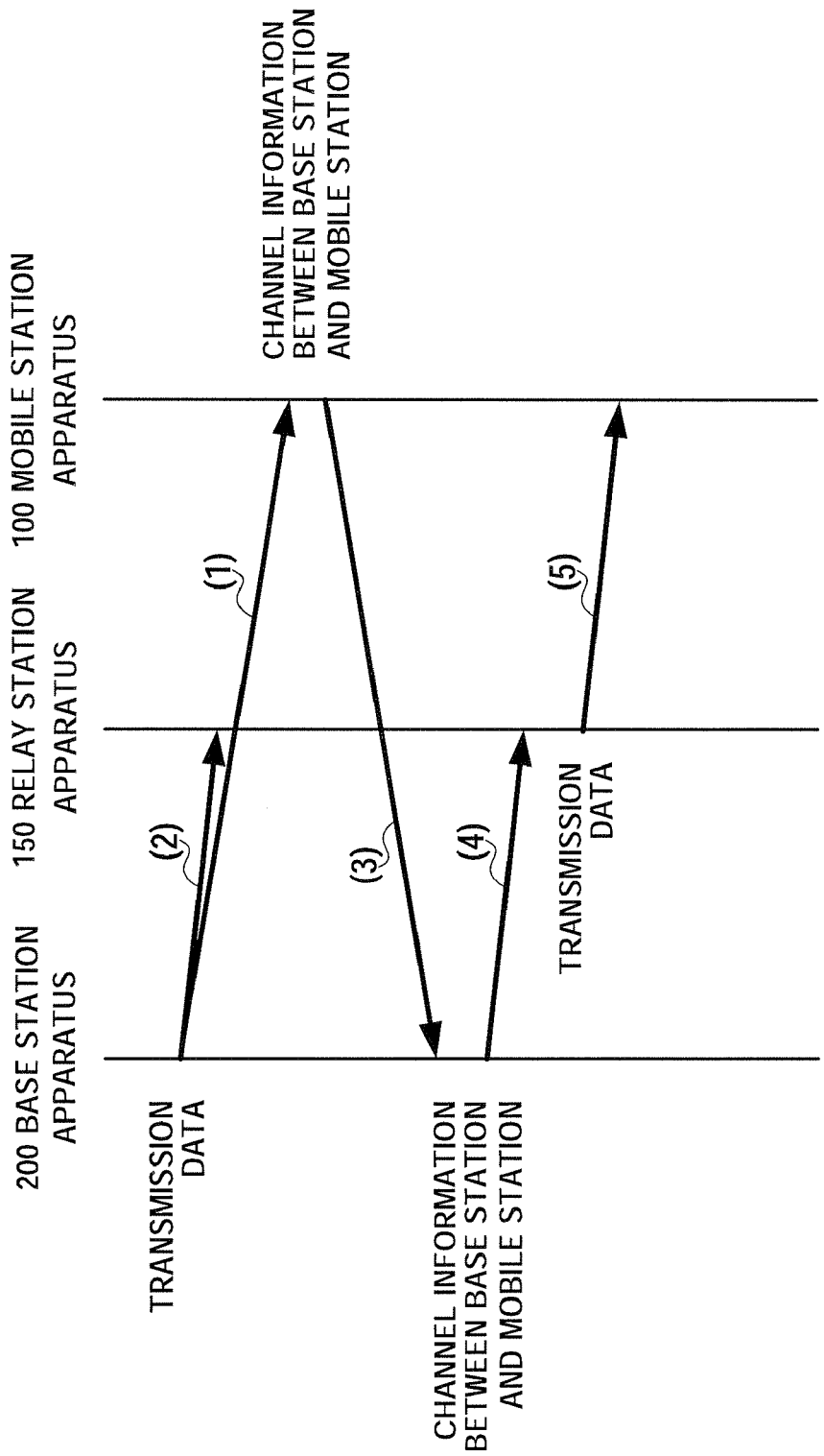
FIG. 2 is a sequence diagram according to embodiment 1.
Figure 3A:
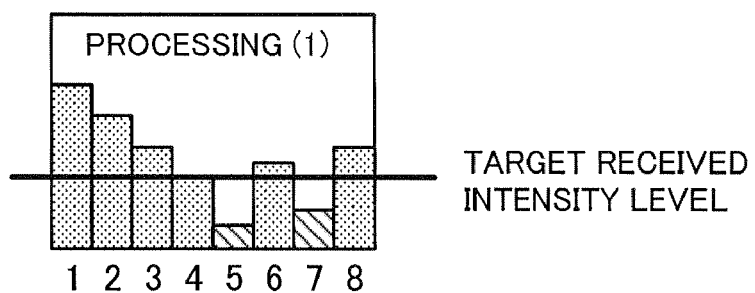
FIG. 3A is a diagram showing an example of a received intensity level for each subcarrier, according to embodiment 1.
Figure 3B:
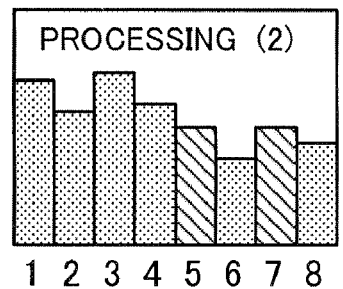
FIG. 3B is a diagram showing an example of a received intensity level for each subcarrier, according to embodiment 1.
Figure 3C:
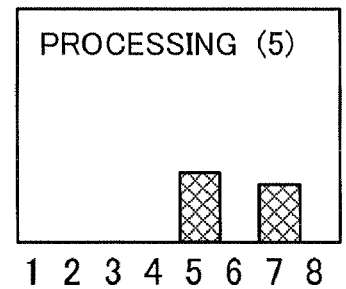
FIG. 3C is a diagram showing an example of a received intensity level for each subcarrier, according to embodiment 1.
Figure 3D:
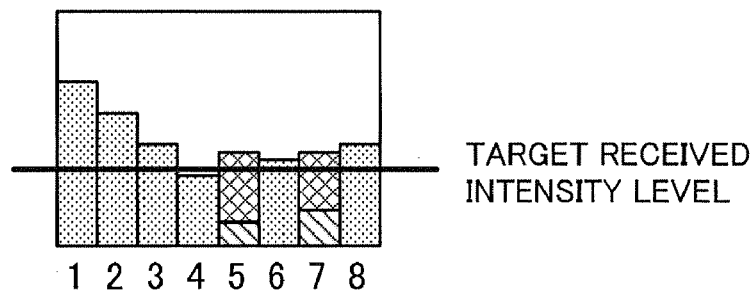
FIG. 3D is a diagram showing an example of a received intensity level for each subcarrier, according to embodiment 1.

FIG. 3A shows the received intensity level for each subcarrier of the signal transmit from base station apparatus 200 to mobile station apparatus 100 in processing (1) of FIG. 2; FIG. 3B shows the received intensity level for each subcarrier of the signal transmit from base station apparatus 200 to relay station apparatus 150 in processing (2) of FIG. 2; FIG. 3C shows the received intensity level for each subcarrier of the signal transmitted from relay station apparatus 150 to mobile station apparatus 100 in processing (5) of FIG. 2; FIG. 3D shows the received intensity level for each subcarrier after the signal combination in mobile station apparatus 100, respectively. The received intensity level differs for every subcarrier due to the influence of the frequency-selective fading propagation.

From the signal shown in FIG. 3A, the fifth and seventh subcarriers are selected as subcarriers of low-received quality (which do not reach a target received intensity level). According to this selection result, relay station apparatus 150 relay-transmits, as shown in FIG. 3C, only the fifth and seventh subcarriers from the received signal shown in FIG. 3B. Mobile station apparatus 100 combines the signal received in processing (1) of FIG. 2 and shown in FIG. 3A and the signal received in processing (5) of FIG. 2 and shown in FIG. 3C, to obtain the signal shown in FIG. 3D.

Next, the configurations of mobile station apparatus 100, relay station apparatus 150 and base station apparatus 200 will be described.

Figure 4:
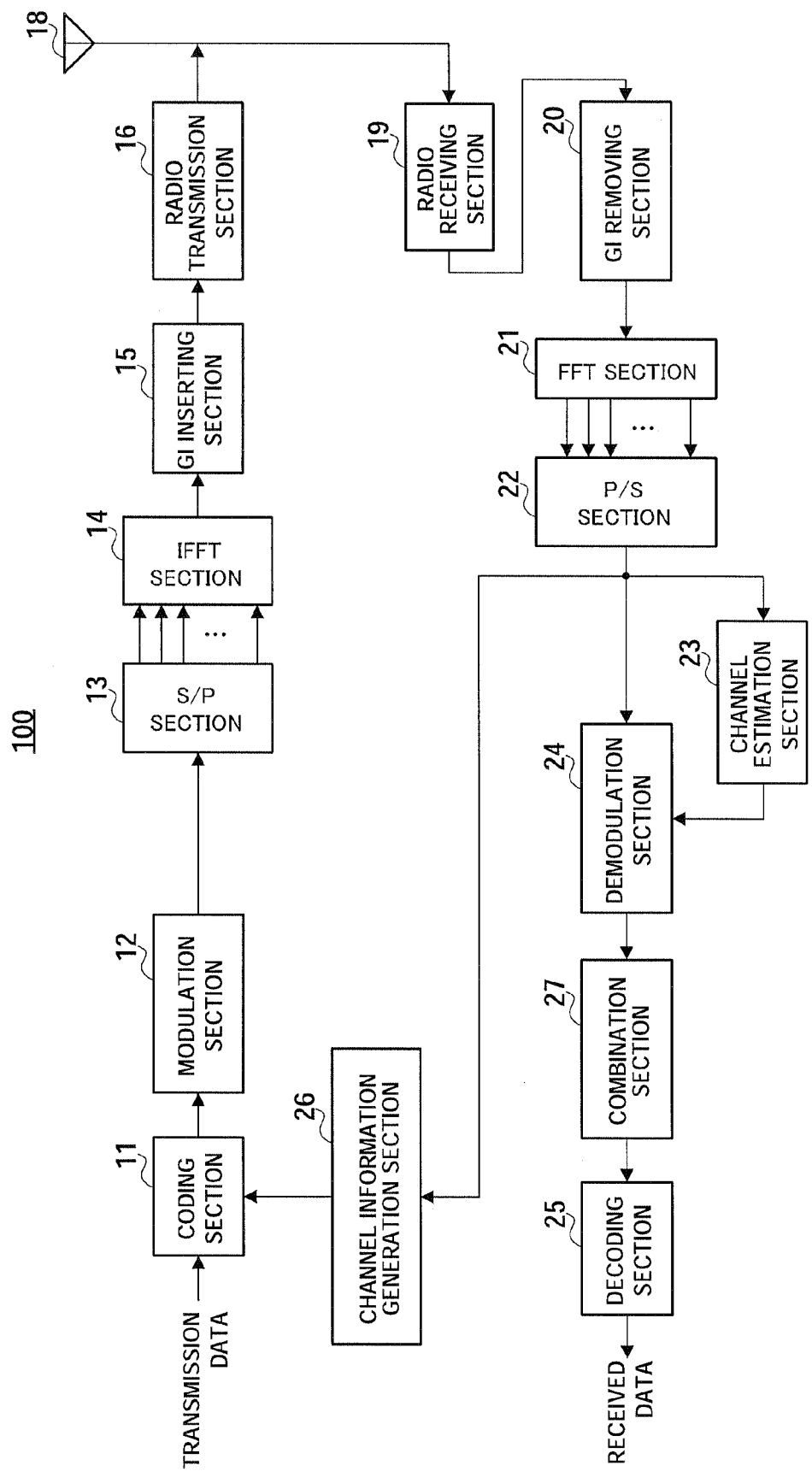
FIG. 4 is a block diagram showing a configuration of a mobile station apparatus according to embodiment 1.

FIG. 4 is a block diagram showing a configuration of mobile station apparatus 100 according to the present embodiment. Mobile station apparatus 100 of the present embodiment is comprised of: antenna 18; radio receiving section 19 that receives a radio signal; GI removing section 20 that removes a guard interval (GI); FFT section 21 that carries out an FFT processing; P/S section 22 that carries out P/S conversion; channel estimation section 23 that carries out channel estimation; demodulation section 24 that carries out demodulation of the received signal; combination section 27 that combines the demodulated signals; decoding section 25 that carries out decoding; channel information generation section 26 that generates channel information; coding section 11 that carries out encoding; modulation section 12 that carries out modulation; S/P section 13 that carries out S/P conversion; IFFT section 14 that carries out IFFT processing; GI inserting section 15 that inserts a GI; and radio transmission section 16 that transmits a radio signal.

Next, the processing of mobile station apparatus 100 shown in FIG. 4 will be described. The processing is broadly classified into reception processing and transmission processing.

First, the reception processing will be described. Antenna 18 receives a radio signal from base station apparatus 200 or from other mobile station such as relay station apparatus 150 or the like. Radio receiving section 19 subjects the received signal to a radio processing such as down-conversion, to obtain a baseband signal. GI removing section 20 removes the guard interval. FFT section 21 carries out an FFT processing in which the received signal is converted from the time domain to the frequency domain and the received signal of each subcarrier is inputted to P/S section 22. P/S section 22 carries out parallel-serial conversion. The received signal which has been subjected to the parallel-serial conversion is inputted to channel estimation section 23, demodulation section 24, and channel information generation section 26. The processing of channel information generation section 26 will be described later. Channel estimation section 23 estimates a propagation path for each subcarrier and generates a propagation path estimation value. The propagation path estimation value is inputted to demodulation section 24. Demodulation section 24 reduces the error caused by the influence of amplitude fluctuation and phase fluctuation of the propagation path and demodulates the signal, by dividing the inputted received signal by the propagation path estimation value. Combination section 27 combines the signal transmitted from base section device 200 and the signal transmitted from relay section device 150. The combined signal is inputted to the decoding section. Decoding section 25 decodes the received signal and outputs received data.

Figure 5:
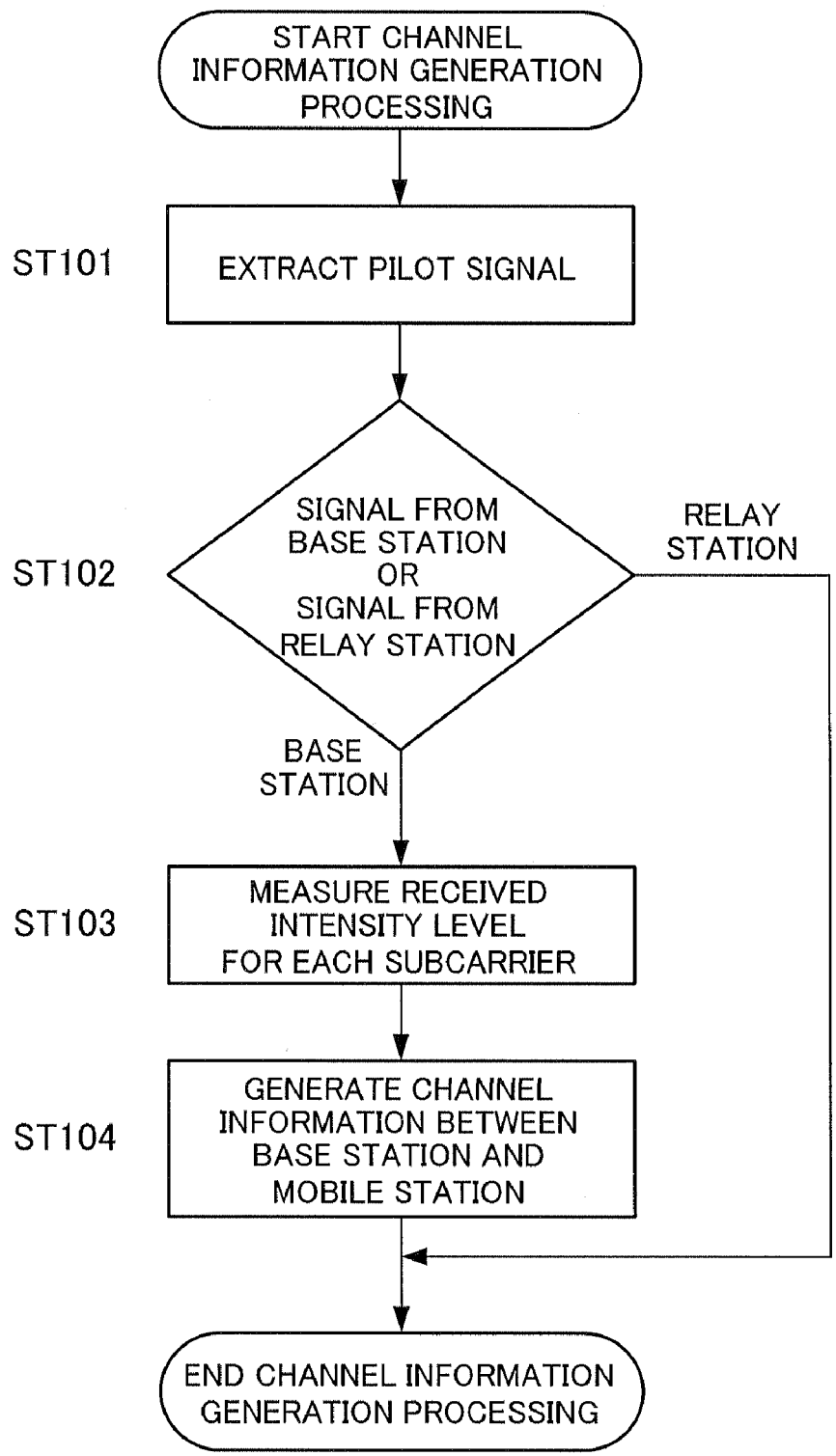
FIG. 5 is a flow chart for a channel information generation processing of the mobile station apparatus, according to embodiment 1.

Next, the processing of channel information generation section 26 will be described in detail using the flow chart of FIG. 5. In ST (step) 101, a pilot signal is extracted from the received signal. In ST102, it is judged whether the received signal is a signal from the base station or signal from the relay station, and, when the received signal is a signal from the base station, the received intensity level is measured for each subcarrier from the extracted pilot signal. In ST 104, channel information of the signal from the base station in the mobile station is generated.

Next, the transmission processing will be described. Coding section 11 subjects the inputted time-series transmission data or the channel information to encoding with turbo code or the like, and the encoded transmission signal is inputted to modulation section 12. Depending on the transmission timing of the respective signals, a control section (not shown) controls which of the transmission data and the channel information is to be subjected to the encoding processing. Modulation section 12 subjects the transmission data to modulation such as QPSK, 16 QAM or the like. The modulated transmission data is inputted to S/P section 13. S/P section 13 subjects the transmission signal to serial-parallel conversion. The transmission signal that has been subjected to the serial-parallel conversion is inputted to IFFT section 14. IFFT section 14 carries out an IFFT processing to convert the frequency domain signal to a time domain signal. The transmission signal converted to the time domain is inputted to GI inserting section 15. GI inserting section 15 inserts a guard interval into the transmission signal. The guard interval is inserted in such a way that the end portion of one frame is copied to the head of the frame. The transmission signal to which the guard interval has been added is inputted to radio transmission section 16. Radio transmission section 16 subjects the transmission signal to a radio processing such as up-conversion, and the transmission signal resulting from the radio processing is transmitted from antenna 18.

Figure 6:
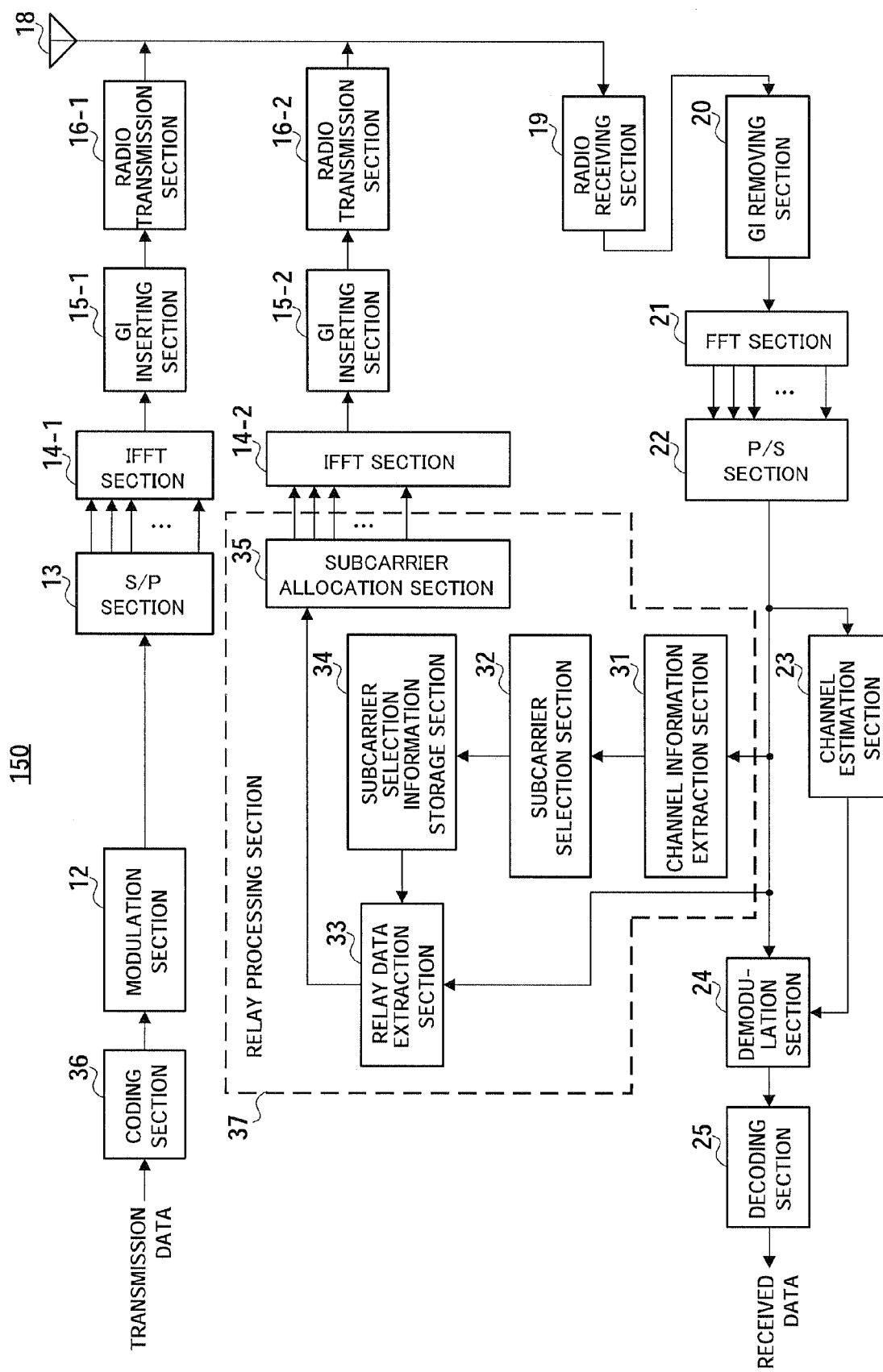
FIG. 6 is a block diagram showing a configuration of a relay station apparatus according to embodiment 1.

FIG. 6 is a block diagram showing a configuration of relay station apparatus 150 according to the present embodiment. The same elements as those in FIG. 4 are designated by the same numerical symbols and description thereof is hereby omitted. Relay station apparatus 150 according to the present embodiment is comprised of antenna 18; radio receiving section 19 that receives a radio signal; GI removing section 20 that removes the GI; FFT section 21 that carries out an FFT processing; P/S section 22 that carries out P/S conversion; channel estimation section 23 that carries out channel estimation, demodulation section 24 that carries out demodulation of the received signal; decoding section 25 that carries out decoding; relay processing section 37 that extracts a subcarrier signal to be relayed; IFFT section 14-2 that carries out an IFFT processing; GI inserting section 15-2 that inserts a guard interval; radio transmission section 16-2 that transmits the radio signal; coding section 36 that carries out encoding; modulation section 12 that carries out modulation; S/P section 13 that carries out S/P conversion; IFFT section 14-1 that carries out an IFFT processing; GI inserting section 15-1 that inserts a guard interval; and a radio transmission section 16-1 that transmits a radio signal.

Next, the configuration and processing of relay processing section 37 will be described in detail. Relay processing section 37 is comprised of channel information extraction section 31 that extracts channel information from the received signal; subcarrier selection section 32 that selects a subcarrier to be relayed; subcarrier selection information storage section 34 that stores information of the subcarrier selected by subcarrier selection section 32; relay data extraction section 33 that extracts the subcarrier signal selected by subcarrier selection section 32, from the relay data, in accordance with the information stored in subcarrier selection information storage section 34; and subcarrier allocation section 35 that allocates subcarriers.

Figure 7:
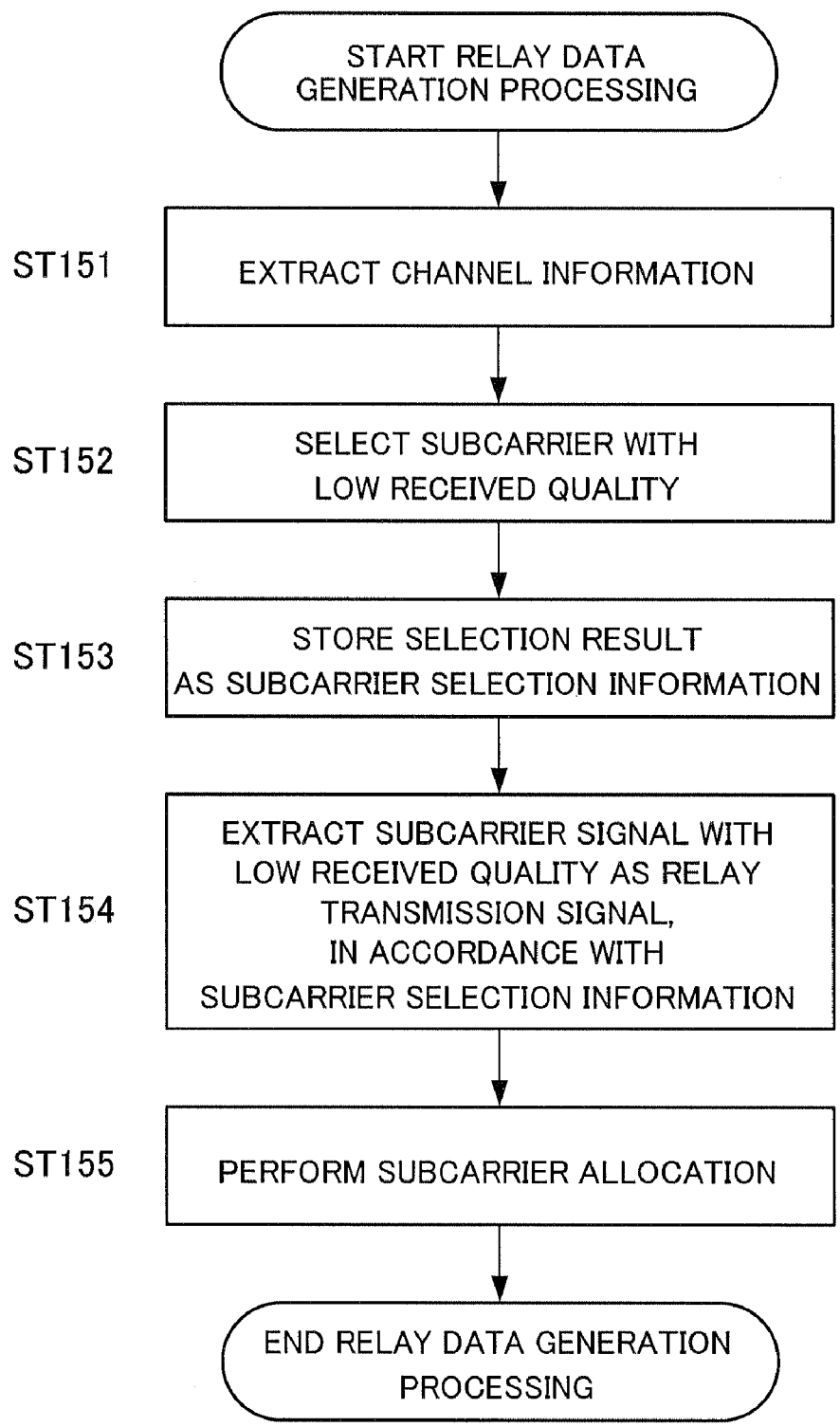
FIG. 7 is a flow chart for a relay processing of a relay station apparatus according to embodiment 1.

Next, the processing of relay processing section 37 will be described using the flow chart of FIG. 7.

In ST (Step) 151, channel information extraction section 31 extracts channel information from the signal inputted from P/S section 22 (the signal received from base station apparatus 200). This channel information is the channel information, in mobile station apparatus 100, of the signal transmitted from base station apparatus 200, and relay station apparatus 150 also receives from base station apparatus 200, together with the channel information, the identification information of mobile station apparatus 100 which has generated the channel information. The extracted channel information is inputted to subcarrier selection section 32.

In ST152, subcarrier selection section 32 selects a subcarrier having a lower received intensity level than a predetermined target received intensity level, in accordance with the extracted channel information. For instance, when channel information as shown in FIG. 3A is given, since the received quality of the fifth and seventh subcarriers is low, information for identifying the fifth and seventh subcarriers is generated as selection subcarrier information.

In ST153, these subcarrier selection results are stored, for each identification information of mobile station apparatus 100, in subcarrier selection information storage section 34, as subcarrier selection information (identification information or the like of selected subcarriers).

In ST154, relay data extraction section 33 acquires, from subcarrier selection information storage section 34, subcarrier selection information which matches the identification information of mobile station apparatus 100 to which the relay is made, and in accordance with the acquired subcarrier selection information, extracts a subcarrier signal to be relay-transmitted and inputs it to subcarrier allocation section 35.

In ST155, subcarrier allocation section 35 allocates the subcarrier signal to be relay-transmitted, to each subcarrier. In this example, subcarrier allocation section 35 allocates the subcarrier signal to be relay-transmitted to each subcarrier, by using the same mapping as the mapping of the multicarrier signal received by relay station apparatus 150. In other words, the extracted subcarrier signal is allocated to each subcarrier without changing the allocation to the subcarriers. Therefore, in mobile station apparatus 100, it is possible to easily combine the signal transmitted from base station apparatus 200 with the signal relayed by relay station apparatus 150.

Figure 8:
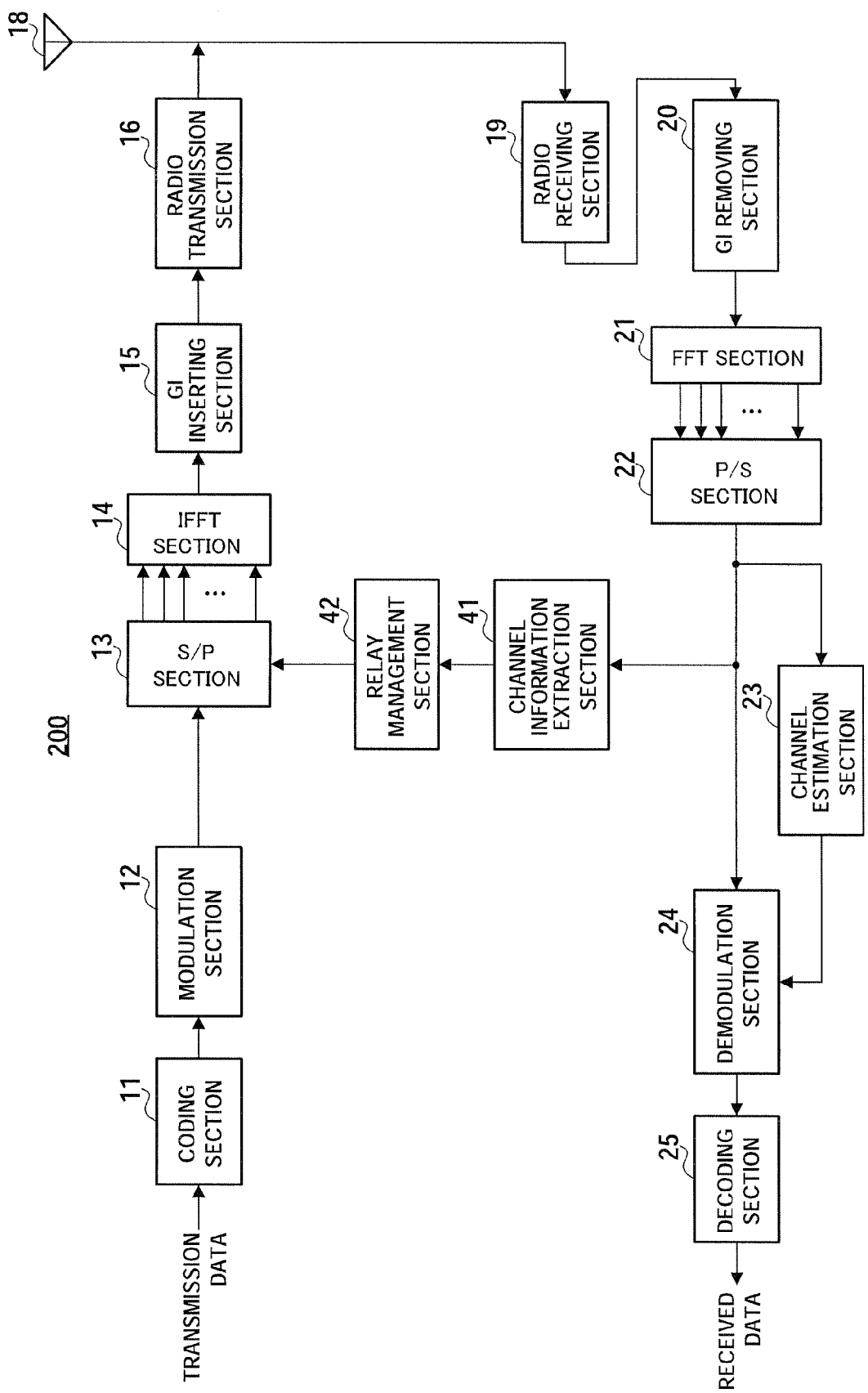
FIG. 8 is a block diagram showing a configuration of a base station apparatus according to embodiment 1.

FIG. 8 is a block diagram showing a configuration of base station apparatus 200 according to the present embodiment. The same elements as those of FIG. 4 are designated by the same numerical symbols and description thereof is hereby omitted. Base station apparatus 200 according to the present embodiment receives data signals from mobile station apparatus 100 or relay station apparatus 150 and channel information from mobile station apparatus 100, and transmits transmission data addressed to relay station apparatus 150, transmission data addressed to mobile station apparatus 100, and channel information addressed to relay station apparatus 150 and identification information of mobile station apparatus 100 which has generated that channel information.

Figure 9:
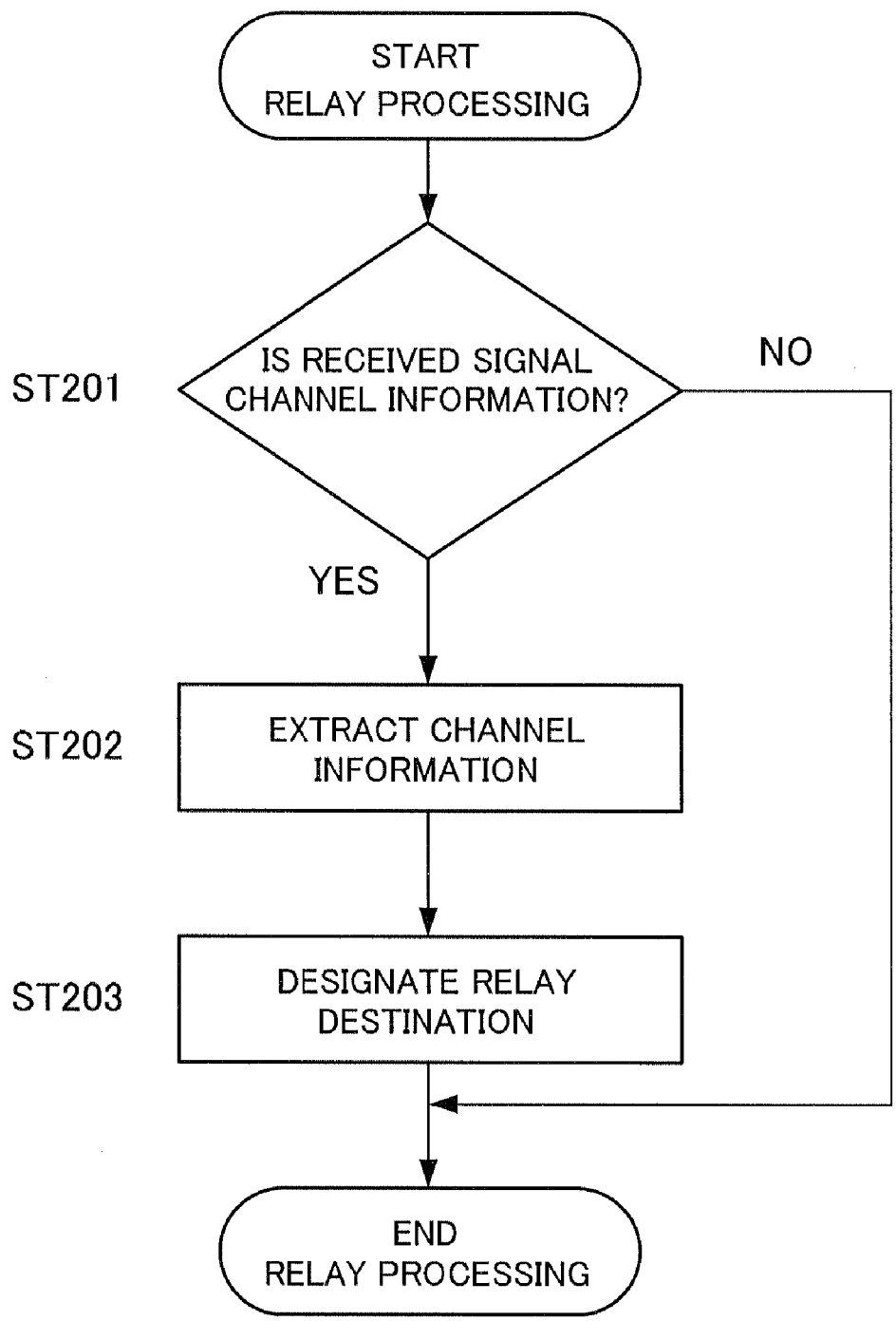
FIG. 9 is a flow chart for a relay processing of the base station apparatus according to embodiment 1.

Next, the processings of channel information extraction section 41 and relay management section 42 of base station apparatus 200 will be described in detail using the flow chart in FIG. 9.

In ST (step) 201, channel information extraction section 41 extracts channel information from the received signal, similar to channel information extraction section 31 of relay station apparatus 150 in FIG. 6. Then, it is judged whether the received signal is channel information. When the received signal is not channel information, relaying is not carried out. When the received signal is channel information, the flow proceeds to ST202.

In ST202, an extraction processing is carried out by channel information extraction section 41.

In ST203, relay station apparatus 150 is designated as the destination of the channel information, from information which shows which relay station carries out relaying of which mobile station and which is managed by relay management section 42.

Next, the channel information whose relay destination has been designated is inputted to S/P section 13, and is transmitted to relay station apparatus 150 after a transmission processing has been carried out.

In the present embodiment, since the subcarrier to be relayed by relay station apparatus 150 is limited to a subcarrier having low received quality between mobile station apparatus 100 and base station apparatus 200 (in other words, a subcarrier requiring diversity effect), it is possible to reduce the transmission power of relay station apparatus 150, compared to the case of relaying all subcarriers.

Also, mobile station apparatus 100 can combine a signal transmitted from base station apparatus 200 with a signal transmitted from relay station apparatus 150 and receive the signal, the received quality can be improved, and communication with a reduced bit error rate or with higher data rate becomes possible.

In the present embodiment, although the channel information is transmitted from mobile station apparatus 100 to base station apparatus 200, and is relayed from base station apparatus 200 back to relay station apparatus 150, it may be transmitted directly from mobile station apparatus 100 to relay station apparatus 150.

In the present embodiment, the channel information is generated by mobile station apparatus 100. However, it may also be generated by using the received quality of base station apparatus 200.

Also, in the present embodiment, the channel information to be used for transmitting relay data is channel information of the above-mentioned frame. However, the channel information of several frames before may also be used.

Also, in the present embodiment, the channel information and the transmission signal are transmitted separately. However, they may be transmitted in the same frame.

Also, in the case of TDD-OFDM, the base station apparatus 200 may generate the channel information from the received quality of the uplink signal to be transmitted from mobile station apparatus 100 to base station apparatus 200, and transmit it to relay station apparatus 150.

Also, although in the present embodiment received intensity was used as received quality, SIR, SNR, SINR or the amount of interference may also be used.

Also, the target received intensity level may be set to a received intensity level at which a desired error rate characteristic in mobile station apparatus 100 can be satisfied.

The timing at which relay station apparatus 150 transmits the relay signal may be controlled in advance by control station (not shown) which is base station apparatus 200 or an upper level station, in such a way that this timing should not overlap with the transmission timing of the signal that base station apparatus 200 transmits to mobile station apparatus 100.

Also, with respect to the selection of relay station apparatus 150, base station apparatus 200, an upper level control station apparatus or mobile station apparatus 100 may select a relay station apparatus with excellent received quality.

Also, a power control section that controls the power intensity for each subcarrier may further be provided. The diversity effect at the mobile station may be calculated by the relay station apparatus and the power may be controlled so as to reach a predetermined target level. According to the method for calculating the diversity effect, the power may be controlled such that the power level for each selected subcarrier is kept equal to or higher than an intensity level obtained by deducting an intensity level at which the subcarrier is actually received by the mobile station from a target level for reception by the mobile station. Also, the power intensity for each subcarrier obtained by the above deduction may be set to a lowest level, and the power intensity may be increased from that level with a fixed margin. Also, the power may be controlled in accordance with the characteristics of the propagation path between the mobile station and the relay station. The power level may also be controlled in accordance with the remaining battery power of the relay station.

Also, the subcarrier selection information may be transmitted from the base station or the mobile station, received by the relay station and held as subcarrier selection information in the subcarrier selection information storage section.

Also, the subcarrier selection information may be updated at regular time intervals or upon reception of a fixed number of relay frames.

Also, the subcarrier selection information may be held for each relay frame (a single frame or a plurality of frames).

Also, the relay data extraction section may be configured to include the subcarrier selection information storage section.

Embodiment 2

In the present embodiment, an example is shown that a relay station apparatus relays a subcarrier signal having low received quality of the signal from a base station apparatus in a mobile station apparatus, by means of a subcarrier having high received quality of the signal from the relay station apparatus in the mobile station apparatus.

Figure 10:
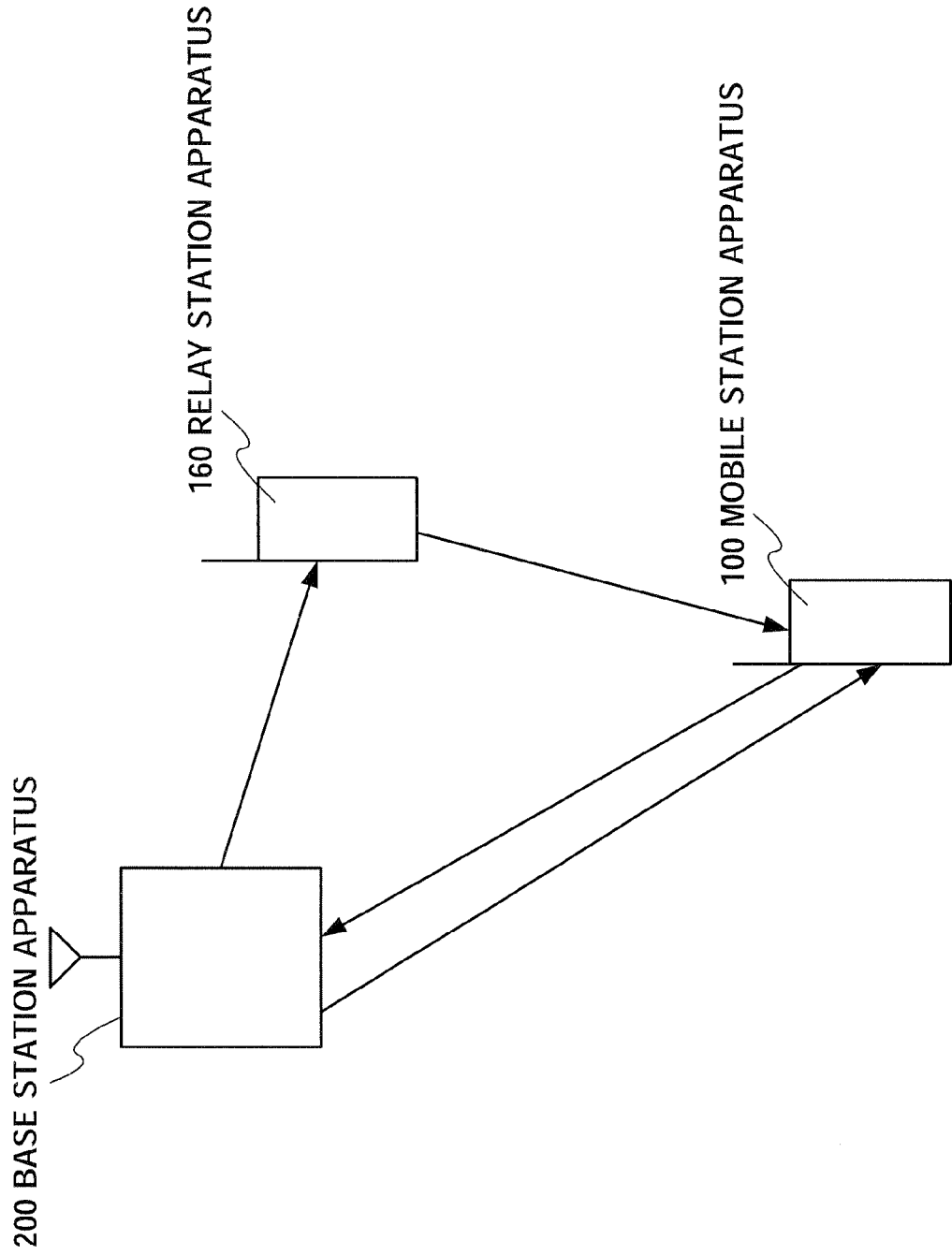
FIG. 10 is a configuration diagram of a mobile communication system according to embodiment 2.

As shown in FIG. 10, a mobile communication system according to the present embodiment is comprised of mobile station apparatus 100, relay station apparatus 160 and base station apparatus 200.

Next, the overall processing will be described using the sequence diagram shown in FIG. 11.

Processings (1) to (4) are the same as those described in embodiment 1 (FIG. 2), and processings (1) to (4) are repeated for as many times as the number of frames. In the example shown in FIG. 11, the processings are repeated over 3 frames.

Next, mobile station apparatus 100 generates channel information in which the received quality of the signal transmitted from relay station apparatus 160 is assigned a level, and transmits the information to base station apparatus 200 (processing (5)). Base station apparatus 200 relays this channel information, as well, to relay station apparatus 160 (processing (6)). From the signals received from base station apparatus 200, relay station apparatus 160 combines, by changing the mapping of the subcarriers, the signals addressed to mobile station apparatus 100 of as many subcarriers as the plurality of frames which are designated to be relayed as channel information, and relay-transmits them to mobile station apparatus 100 as frame 4 (processing (7)).

Figure 12:
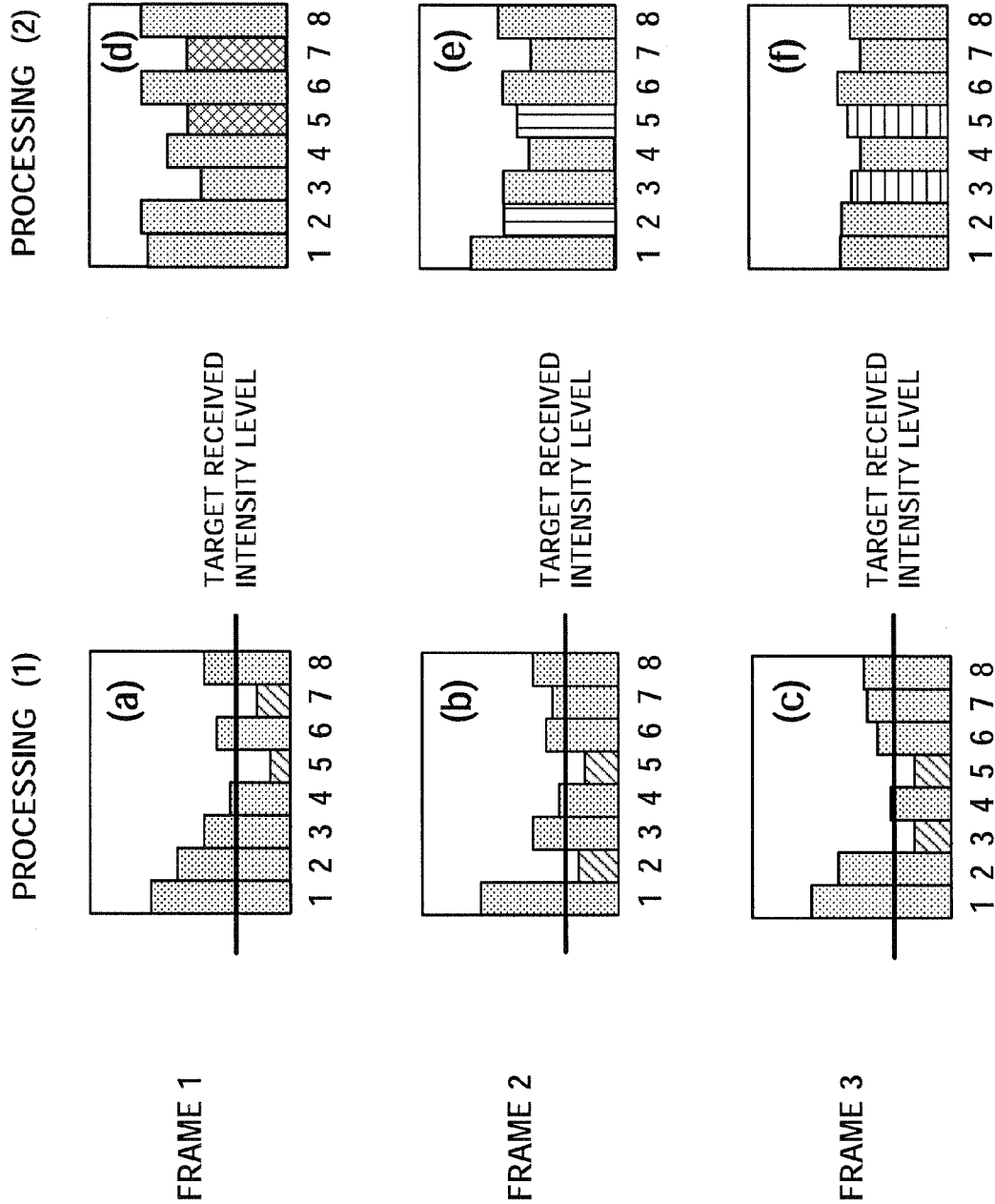
FIG. 12 is a diagram showing an example of a received intensity level for each subcarrier according to embodiment 2.
Figure 13:
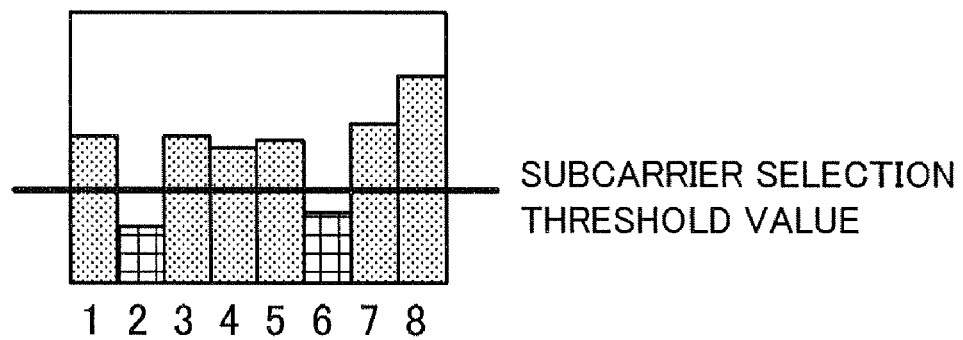
FIG. 13 is a diagram showing an example of a received intensity level for each subcarrier according to embodiment 2.
Figure 14:
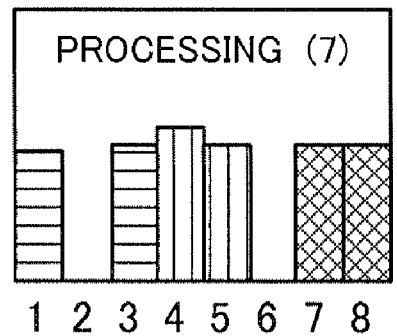
FIG. 14 is a diagram showing an example of a received intensity level for each subcarrier according to embodiment 2.

FIG. 12 to FIG. 14 are diagrams for describing the processing concept in the present embodiment. Similar to embodiment 1, received intensity level is used as received quality. In FIG. 12, frames 1 to 3 are frame signals sequentially transmitted by base station apparatus 200 to mobile station apparatus 100 and relay station apparatus 160, and, in FIG. 14, frame 4 shows a frame signal transmitted by relay station apparatus 160, which combines the frame signals of these frames 1 to 3 by changing the mapping of the subcarriers, to mobile station apparatus 100.

Figure 11:
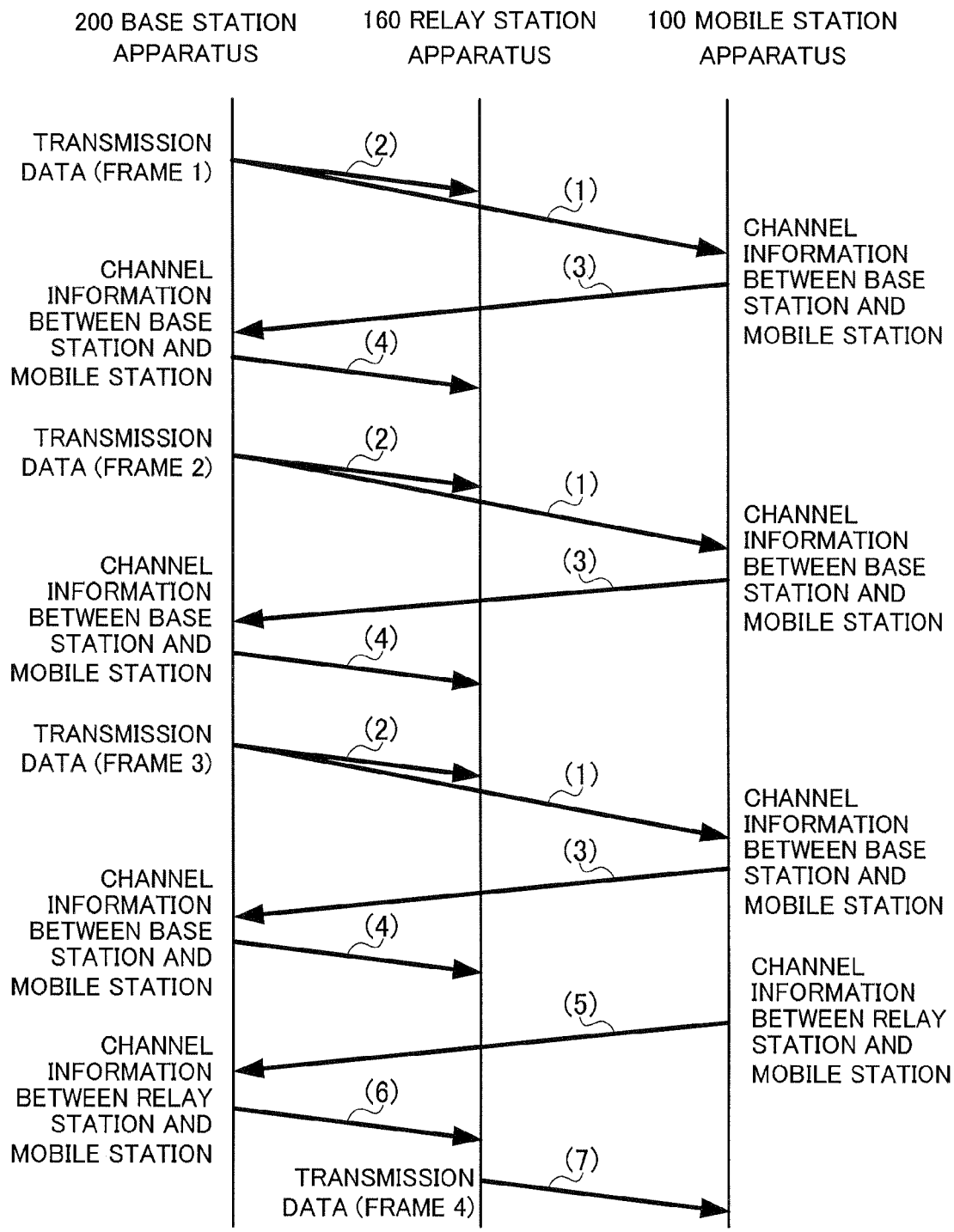
FIG. 11 is a sequence diagram according to embodiment 2.

FIGS. 12(a) to (c) show the received intensity level for each subcarrier in mobile station apparatus 100, of the signal transmitted from base station apparatus 200 using the frames 1 to 3 in processing (1) of FIG. 11. Also, FIGS. 12(d) to (f) show the received intensity level for each subcarrier in relay station apparatus 160, of the signal transmitted from base station apparatus 200 using the frames 1 to 3 in processing (2) of FIG. 11. Also, FIG. 13 shows the received intensity level for each subcarrier in mobile station apparatus 100, of the signal transmitted from relay station apparatus 160. The received intensity level shown in FIG. 13 is measured before the frame 4 is transmitted, and is transmitted in processing (5) and processing (6) of FIG. 11. FIG. 14 shows the received intensity level for each subcarrier in mobile station apparatus 100, of the relay signal transmitted by relay station apparatus 160 using frame 4 in processing (7) of FIG. 11.

As shown in FIGS. 12(a) to (c), in processing (1) of FIG. 11, the received intensity level of the fifth and seventh subcarriers in frame 1, the second and fifth subcarriers in frame 2, the third and fifth subcarriers in frame 3 does not reach a target received intensity level and the received quality is low. Accordingly, relay station apparatus 160 extracts, from the signal received from base station apparatus 200, and relay-transmits the signals of the fifth and seventh subcarriers in FIG. 12(d), the second and fifth subcarriers in FIG. 12(e), and of the third and fifth subcarriers of FIG. 12(f).

Also, in accordance with the channel information between the relay station apparatus and the mobile station apparatus (FIG. 13), relay station apparatus 160 selects a subcarrier at which the received intensity level reaches a threshold value, as a subcarrier to be used for relay-transmission. In FIG. 13, since the received quality of subcarriers other than the second and the sixth subcarriers is high, relay station apparatus 160 selects the first, third, fourth, fifth, seventh and eighth subcarriers as subcarriers for relay-transmission. As shown in FIG. 14, relay station apparatus 160 allocates the relay signals extracted in FIGS. 12(d), (e) and (f) to relay-transmission subcarriers which differ from one another, and generates frame 4 which is a relay frame. Thus, since the subcarrier signals extracted over a plurality of times are allocated to subcarriers which differ from one another, relay transmission data can be transmitted at one time, so that it is possible to reduce the number of transmissions from the relay station apparatus and reduce transmission power.

In FIG. 14, the fifth and seventh subcarrier signals in FIG. 12(d) are mapped to the seventh and eighth subcarriers of frame 4, the second and fifth subcarrier signals in FIG. 12(e) are mapped to the fourth and fifth subcarriers of frame 4, the third and fifth subcarrier signals in FIG. 12(f) are mapped to the first and third subcarriers of frame 4, respectively.

In the example shown in FIG. 14, according to the mapping method, allocation is made in decreasing order of the subcarriers of frame 4, in the order of frame 1, frame 2, frame 3, and in the descending order of the subcarriers. Also, allocation may be made in the increasing order of the subcarriers.

Mobile station apparatus 100 shares, in advance, a mapping method in which, mapping information relating to which subcarrier of which relay signal (frames 1 to 3) is allocated to which subcarrier of the relay frame (frame 4) is set to be received from separate relay station apparatus 160, or to be transmitted to relay station apparatus 160.

When a mapping method is shared, since mobile station apparatus 100 and relay station apparatus 160 share two kinds of information, which are the channel information between base station apparatus and mobile station apparatus and the channel information between relay station apparatus and mobile station apparatus, the mobile station apparatus 100 can estimate how mapping is carried out by relay station apparatus 160. Accordingly, mobile station apparatus 100 can combine the signal transmitted from base station apparatus 200 and the signal relay-transmitted from relay station apparatus 160.

Figure 15:
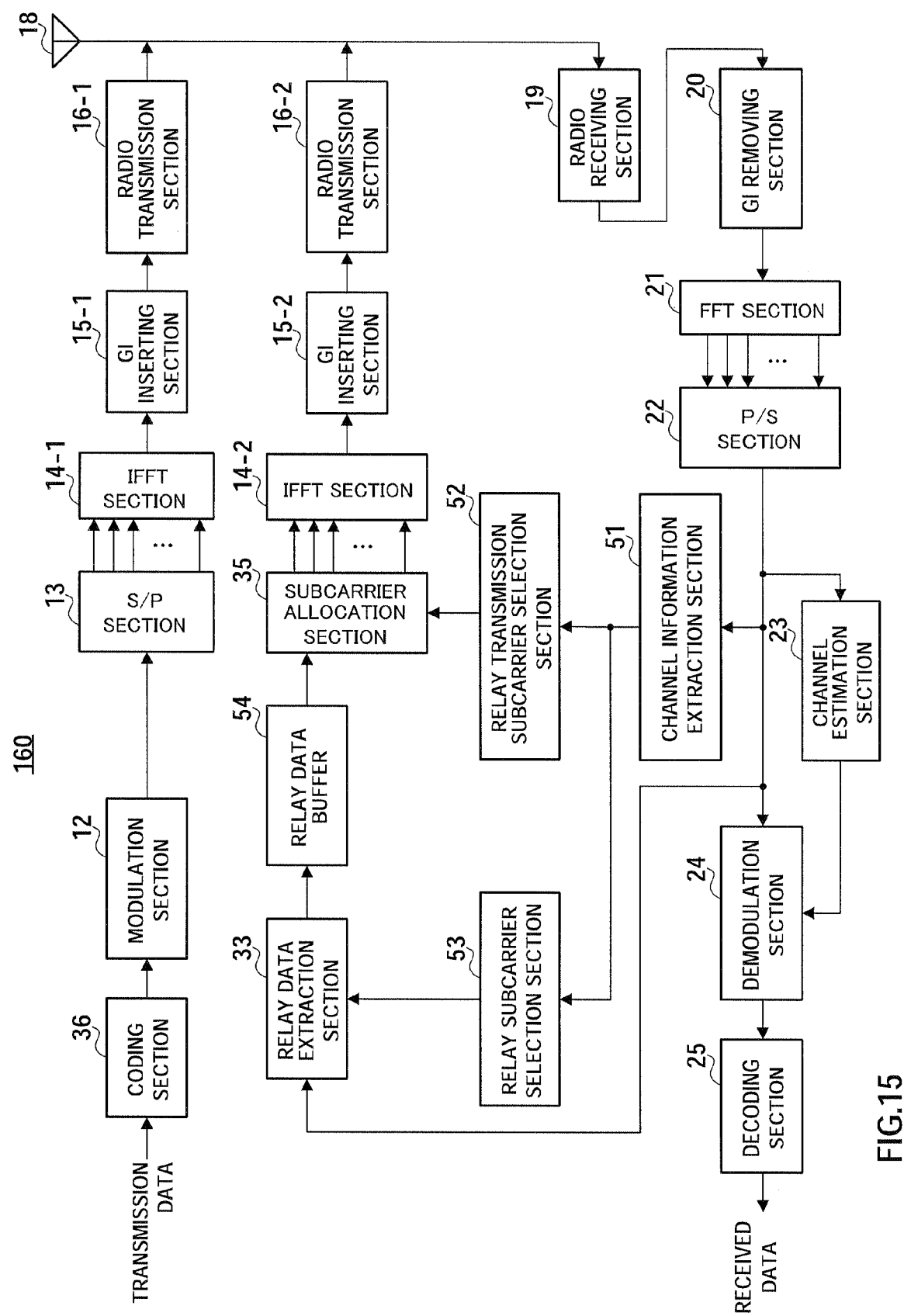
FIG. 15 is a block diagram showing a configuration of a relay station apparatus according to embodiment 2.

FIG. 15 is a block diagram showing a configuration of relay station apparatus 160 according to the present embodiment. The same elements as those of FIG. 6 are designated by the same numerical symbols, and description thereof is hereby omitted.

Channel information extraction section 51 extracts the channel information from the received signal. The extracted channel information includes channel information between base station apparatus 200 and mobile station apparatus 100, and channel information between relay station apparatus 160 and mobile station apparatus 100. The channel information between base station apparatus 200 and mobile station apparatus 100 is inputted to relay subcarrier selection section 53. The channel information between relay station apparatus 160 and mobile station apparatus 100 is inputted to relay transmission subcarrier selection section 52.

In accordance with the channel information between base station apparatus 200 and mobile station apparatus 100, relay subcarrier selection section 53 selects, from the signal transmitted from base station apparatus 200 to mobile station apparatus 100, a subcarrier of low received quality which needs to be relayed. Then, relay subcarrier selection section 53 inputs the information of the subcarrier which has been selected as requiring relaying, to relay data extraction section 33.

Relay data extraction section 33 extracts the signal of the selected subcarrier from the signal addressed to mobile station apparatus 100, and creates relay data. The relay data is inputted to relay data buffer 54.

If the amount of relay data has exceeded a fixed amount or, after a regular interval has passed, relay data buffer 54 inputs the relay data to subcarrier allocation section 35 at one time.

Relay transmission subcarrier selection section 52 selects a subcarrier having high received quality between relay station apparatus 160 and mobile station apparatus 100, in accordance with the channel information between relay station apparatus 160 and mobile station apparatus 100, and sets it as the subcarrier for relay-transmission. The information of the selected relay-transmission subcarrier is inputted to subcarrier allocation section 35. Subcarrier allocation section 35 allocates relay data to the relay transmission subcarrier.

Figure 16:
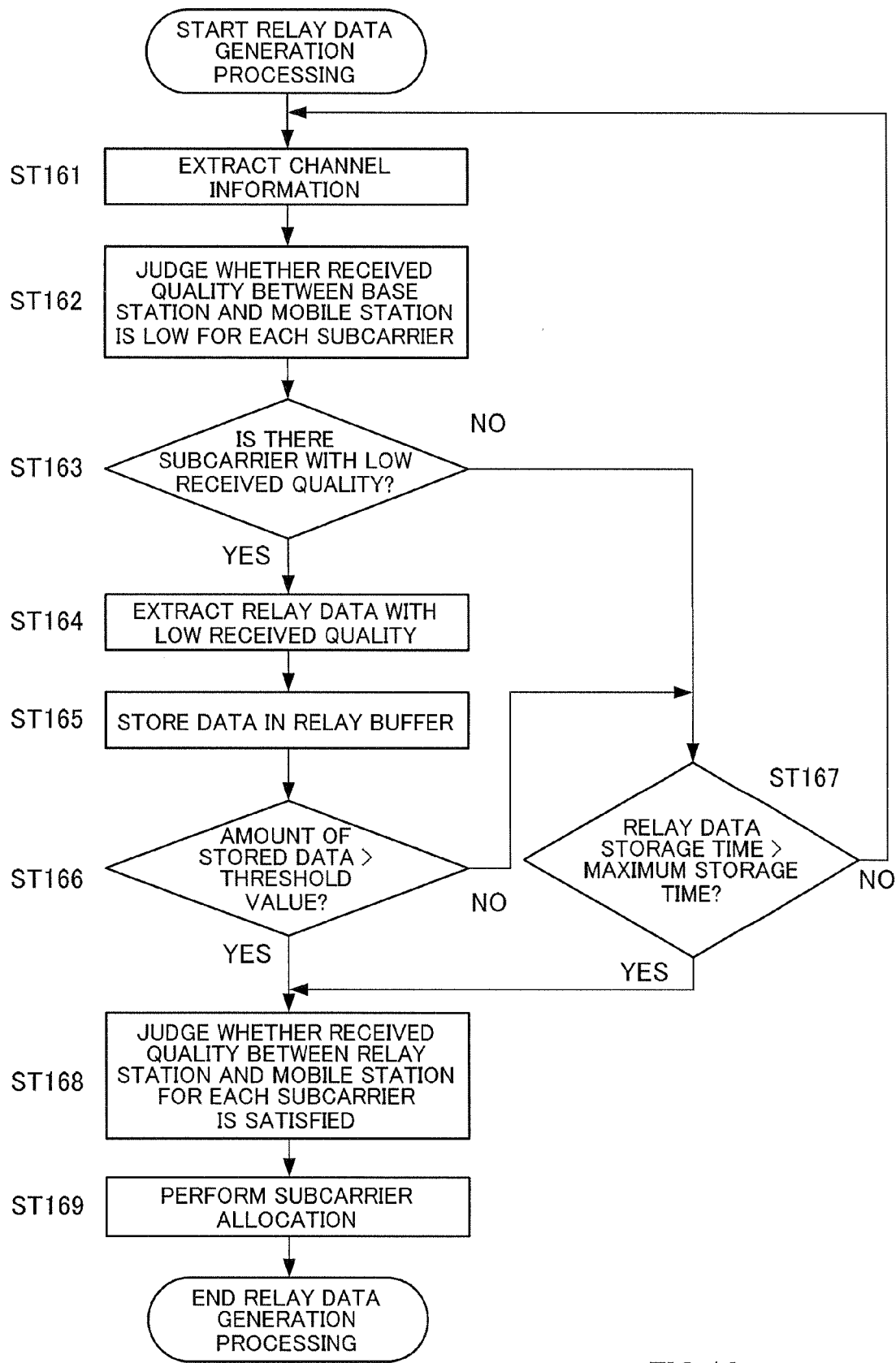
FIG. 16 is a flow chart showing a relay processing for the relay station apparatus according to embodiment 2.

Next, the flow of the relay processing according to the present embodiment will be described using FIG. 16.

First, in ST (step) 161, channel information extraction section 51 extracts the channel information.

In ST162, relay subcarrier selection section 53 judges, for each subcarrier, from the channel information, whether the received quality is low (whether the received intensity level is less than a target received intensity level), and selects the subcarrier with low received quality. Then, in ST163, it is judged whether a subcarrier having low received quality exists. When there is no subcarrier in ST163 which has low received quality, the flow proceeds to ST167. On the one hand, in the case that in ST163, there is a subcarrier with low received quality, the flow proceeds to ST164.

In ST164, relay data extraction section 33 carries out extraction processing for extracting a signal allocated to the subcarrier selected in ST162 from the signal addressed to mobile station apparatus 100.

In ST165, 166 and 167, the processings in relay data buffer 54 are carried out.

In ST165, relay data extraction section 33 stores the relay data extracted in ST164 into relay data buffer In ST166, relay data buffer 54 compares the amount of the stored relay data with a threshold value, and if the amount of relay data is larger than the threshold value, the flow proceeds to ST168, and if it is equal to or smaller than the threshold value, the flow proceeds to ST167.

In ST167, relay data buffer 54 checks the storage period of the relay data in relay data buffer 54, and if the storage period of the oldest data amongst the stored relay data is larger than a maximum storage period, the flow proceeds to ST168, and if it is equal to or smaller than the maximum storage period, the flow proceeds to ST161 to wait for the reception of the next frame.

In ST168, relay transmission subcarrier selection section 52 judges the received quality for each subcarrier, from the channel information between relay station apparatus 160 and mobile station apparatus 100, and decides the subcarrier to be used for transmission.

Then, in ST169, subcarrier allocation section 35 carries out allocation processing to the subcarrier.

In the present embodiment, since relay station apparatus 160 relays by means of a subcarrier having excellent reception characteristics between relay station apparatus 160 and mobile station apparatus 100, the received quality of mobile station apparatus 100 can be improved, and further, since the relay signals of a plurality of frames can be transmitted at one time, the number of transmissions from relay station apparatus 160 can be reduced. Thus, it is possible to reduce the number of times of operating the transmission amplifier for relay, and the power consumption of the relay station apparatus can be reduced.

In the present embodiment, the channel information generated from the received quality between relay station apparatus 160 and mobile station apparatus 100 becomes necessary. In the above description, it was described that this channel information is transmitted from mobile station apparatus 100, via base station apparatus 200. However, it may also be transmitted directly from mobile station apparatus 100 to relay station apparatus 160.

Also, in the case of TDD-OFDM, similar to embodiment 1, instead of the channel information between base station apparatus 200 and mobile station apparatus 100, channel information may be generated from the received quality between mobile station apparatus 100 and base station apparatus 200, which has been measured by base station apparatus 200, and may be directly transmitted from base station apparatus 200 to relay station apparatus 160. Also, the channel information between relay station apparatus 160 and mobile station apparatus 100 may be generated from the received quality between mobile station apparatus 100 and relay station apparatus 160. When the channel information is not generated by mobile station apparatus 100, relay station apparatus 160 transmits the channel information or the mapping results to mobile station apparatus 100, to share the mapping information of the subcarrier, and makes it easy to understand which relay signal is allocated to which subcarrier in mobile station apparatus 100.

Embodiment 3

The present embodiment shows an example that a plurality of relay station apparatuses relay their respective managing subcarriers only.

Figure 17:
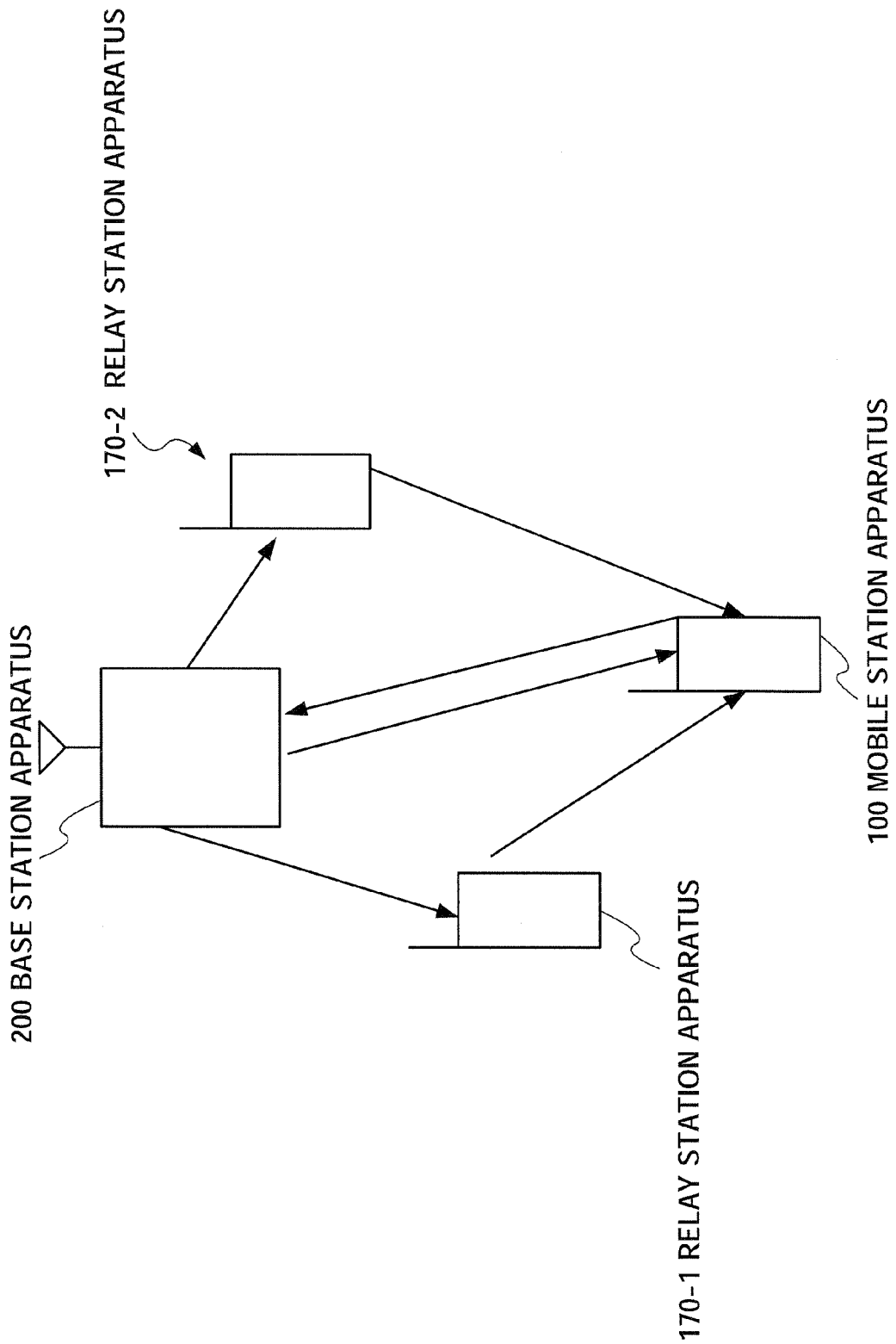
FIG. 17 is a configuration diagram of a mobile communication system according to embodiment 3.

As shown in FIG. 17, a mobile communication system according to the present embodiment is comprised of mobile station apparatus 100, a plurality of relay station apparatuses 170-1 and 170-2, and base station apparatus 200.

Next, a description will be given of the overall processing, using the sequence diagram shown in FIG. 18. The base station apparatus 200 transmits a signal to mobile station apparatus 100 (processing (1)). At this time, relay station apparatus 170-1 and relay station apparatus 170-2, as well, receive the signal transmitted from base station apparatus 200 (processings (2) and (3)). Next, mobile station apparatus 100 generates channel information which has assigning leveled received quality, and reports the channel information between this base station apparatus 200 and mobile station apparatus 100 to base station apparatus 200 (processing (4)). Base station apparatus 200 reports this channel information to relay station apparatus 170-1 and relay station apparatus 170-2 (processing (5) and (6)). Relay station apparatus 170-1 and relay station apparatus 170-2 relay-transmit, to mobile station apparatus 100, a signal, from the signals received from base station apparatus 200, which is addressed to mobile station apparatus 100 and having the subcarriers which are each managed and are designated as required to be relayed in accordance with the channel information, in synchronization with each other (processings (7) and (8)). Thus, relay station apparatus 170-1 and relay station apparatus 170-2 transmit signals in synchronization with each other, and thus, mobile station apparatus 100 can receive the signal from relay station apparatus 170-1 and the signal from relay station apparatus 170-2 around the same time, which makes it possible to merge the plurality of received signals and improve processing efficiency.

Next, an example illustrating the received intensity level of the received signal at mobile station apparatus 100 and relay station apparatuses 170-1 and 170-2 is shown in FIGS. 19A to F. Similarly with embodiment 1, the received intensity level is used as the received quality.

Figure 18:
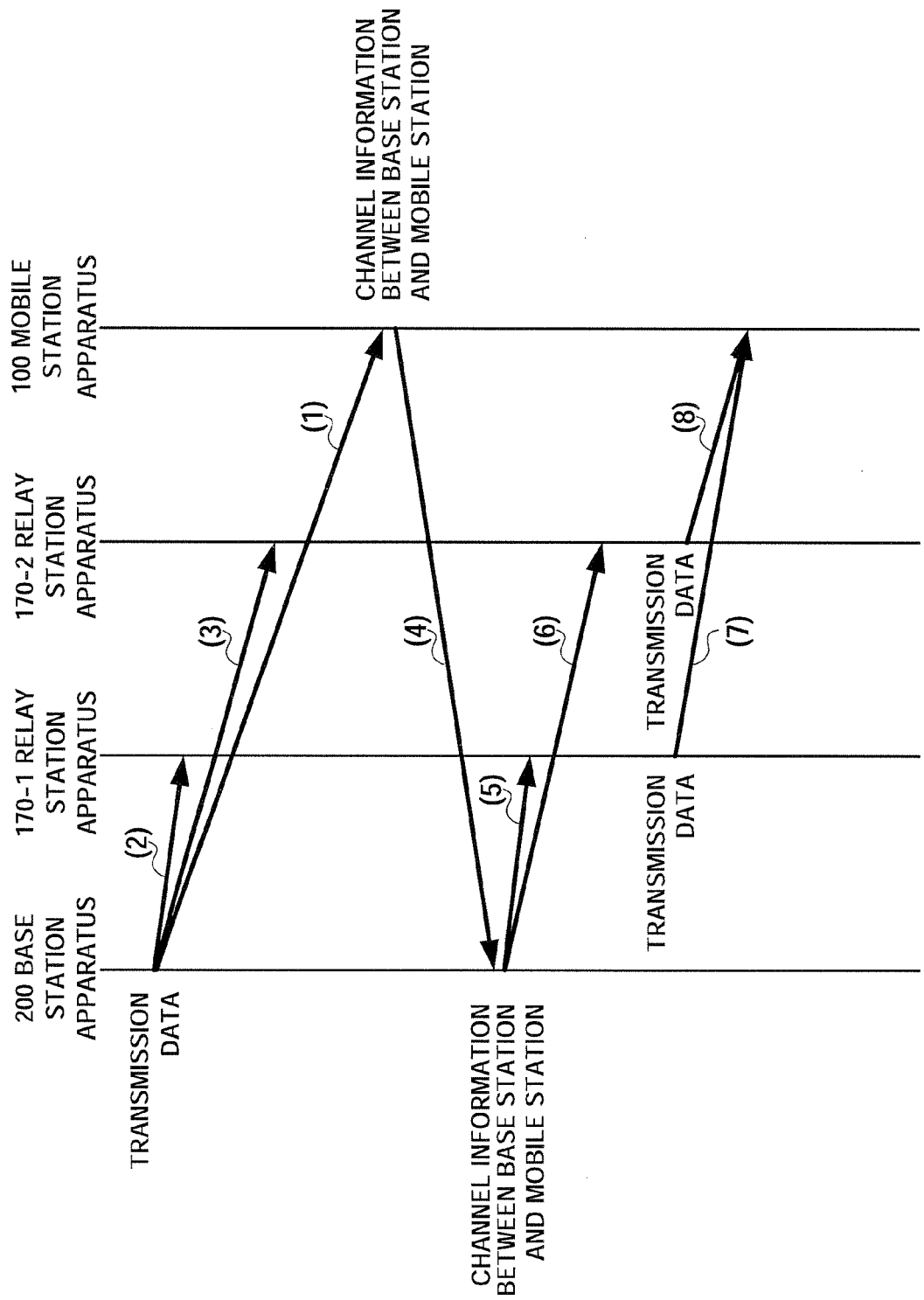
FIG. 18 is a sequence diagram according to embodiment 3.
Figure 19A:
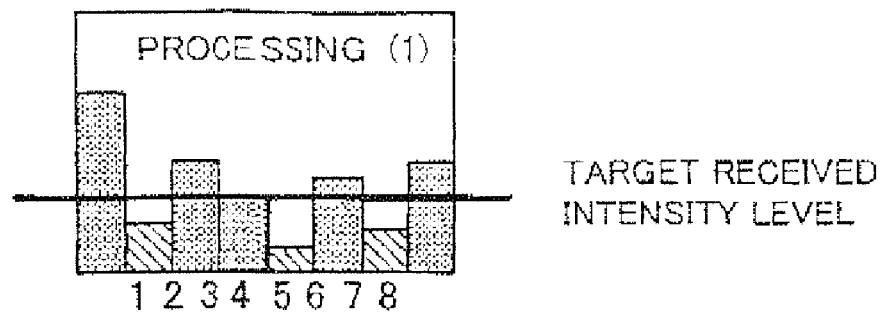
FIG. 19A is a diagram showing an example of a received intensity level for each subcarrier according to embodiment 3.
Figure 19B:
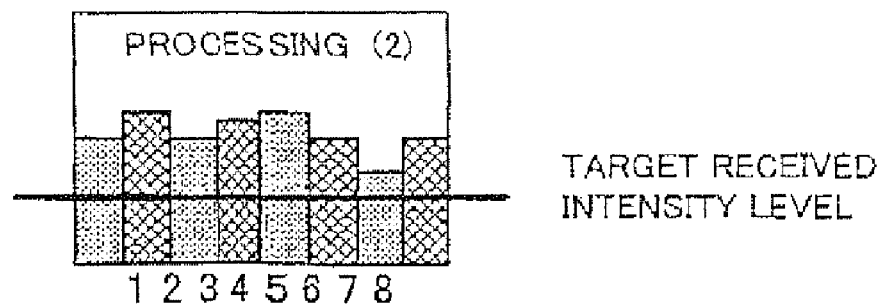
FIG. 19B is a diagram showing an example of a received intensity level for each subcarrier according to embodiment 3.
Figure 19C:
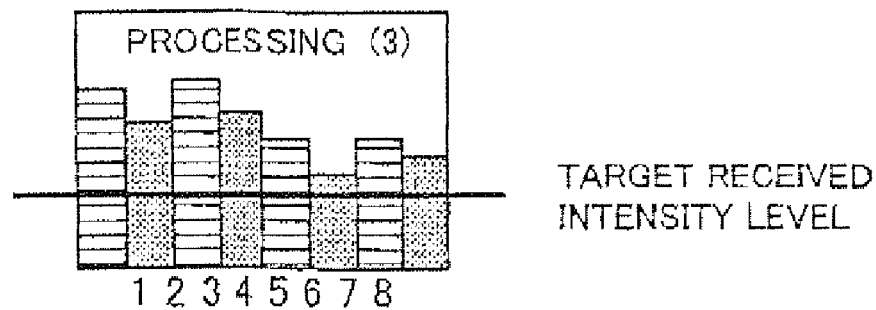
FIG. 19C is a diagram showing an example of a received intensity level for each subcarrier according to embodiment 3.
Figure 19D:
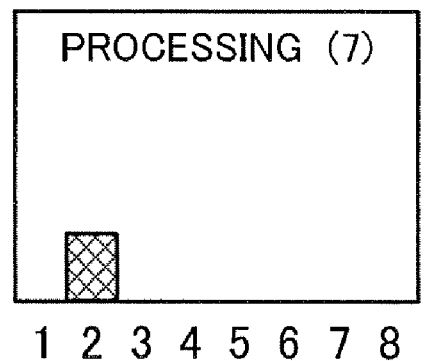
FIG. 19D is a diagram showing an example of a received intensity level for each subcarrier according to embodiment 3.
Figure 19E:
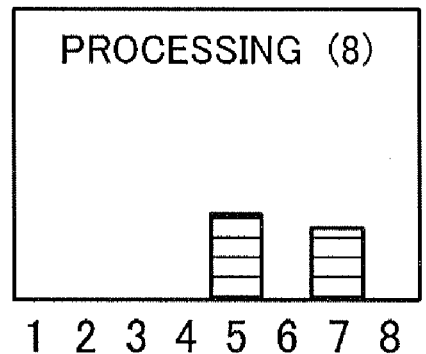
FIG. 19E is a diagram showing an example of a received intensity level for each subcarrier according to embodiment 3.
Figure 19F:
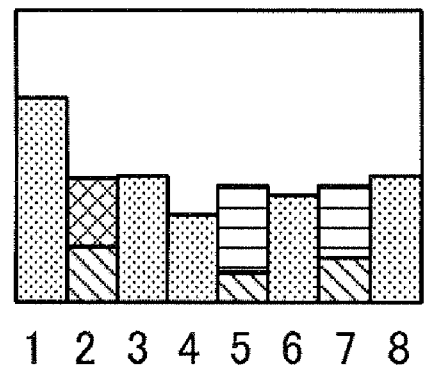
FIG. 19F is a diagram showing an example of a received intensity level for each subcarrier according to embodiment 3.

FIG. 19A shows, the received intensity level for each subcarrier in mobile station apparatus 100, of the signal transmitted by base station apparatus 200 in processing (1) of FIG. 18, FIG. 19B shows the received intensity level for each subcarrier in relay station apparatus 170-1, of the signal transmitted by base station apparatus 200 in processing (2) of FIG. 18, FIG. 19C shows the received intensity level for each subcarrier in relay station apparatus 170-2, of the signal transmitted by base station apparatus 200 in processing (3) of FIG. 18, FIG. 19D shows the received intensity level for each subcarrier in mobile station apparatus 100, of the signal transmitted by relay station apparatus 170-1 in processing (7) of FIG. 18, FIG. 19E shows the received intensity level for each subcarrier in mobile station apparatus 100, of the signal transmitted by relay station apparatus 170-2 at processing (8) of FIG. 18, and FIG. 19F shows the received intensity level for each subcarrier after signal combination in mobile station apparatus 100, respectively. The received intensity level differs for each subcarrier depending on the influence of frequency selective fading propagation path.

Relay station apparatus 170-1 is set in advance to manage the second, fourth, sixth and eighth subcarriers, and relay station apparatus 170-2 is set in advance to manage the first, third, fifth and seventh subcarriers. As shown in FIG. 19A, the received quality of the second, fifth and seventh subcarriers, from the signal transmitted from base station apparatus 200 to mobile station apparatus 100, does not reach a target received intensity level, and received quality is low. Relay station apparatus 170-1 and relay station apparatus 170-2 relay a signal of the managing subcarrier, from amongst these subcarriers. Accordingly, relay station apparatus 170-1 relays the second subcarrier as shown in FIG. 19D, and the relay station apparatus 170-2 relays the fifth and seventh subcarriers as shown in FIG. 19E. Mobile station apparatus 100 combines the signals transmitted from relay station apparatus 170-1 and relay station apparatus 170-2 to mobile station apparatus 100.

Figure 20:
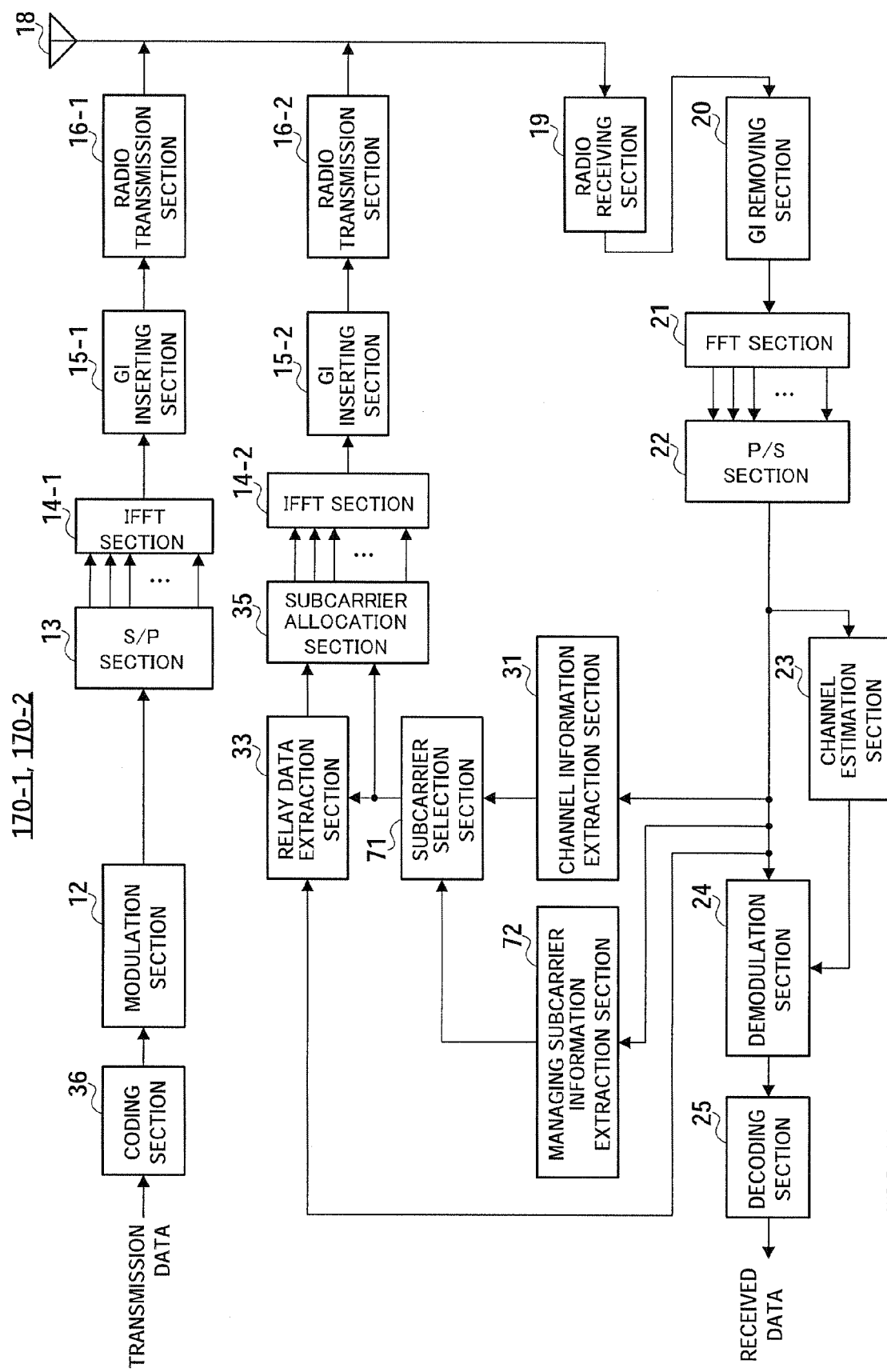
FIG. 20 is a block diagram showing a configuration of a relay station apparatus according to embodiment 3.

Next, the configuration of relay station apparatuses 170-1 and 170-2 will be described. FIG. 20 is a block diagram showing the configuration of relay station apparatuses 170-1 and relay station apparatus 170-2 according to the present embodiment. Relay station apparatuses 170-1 and 170-2 employ the same configuration. Elements which are the same as those of FIG. 6 are designated by the same numerical symbols and description thereof is hereby omitted.

Managing subcarrier information extraction section 72 extracts the number of subcarriers managed by each relay station and inputs it to subcarrier selection section 71. Subcarrier selection section 71 selects from amongst the managing subcarriers a subcarrier, having low received quality, in accordance with the channel information, and inputs the number of the selected subcarrier to relay data extraction section 33 and subcarrier allocation section 35.

Figure 21:
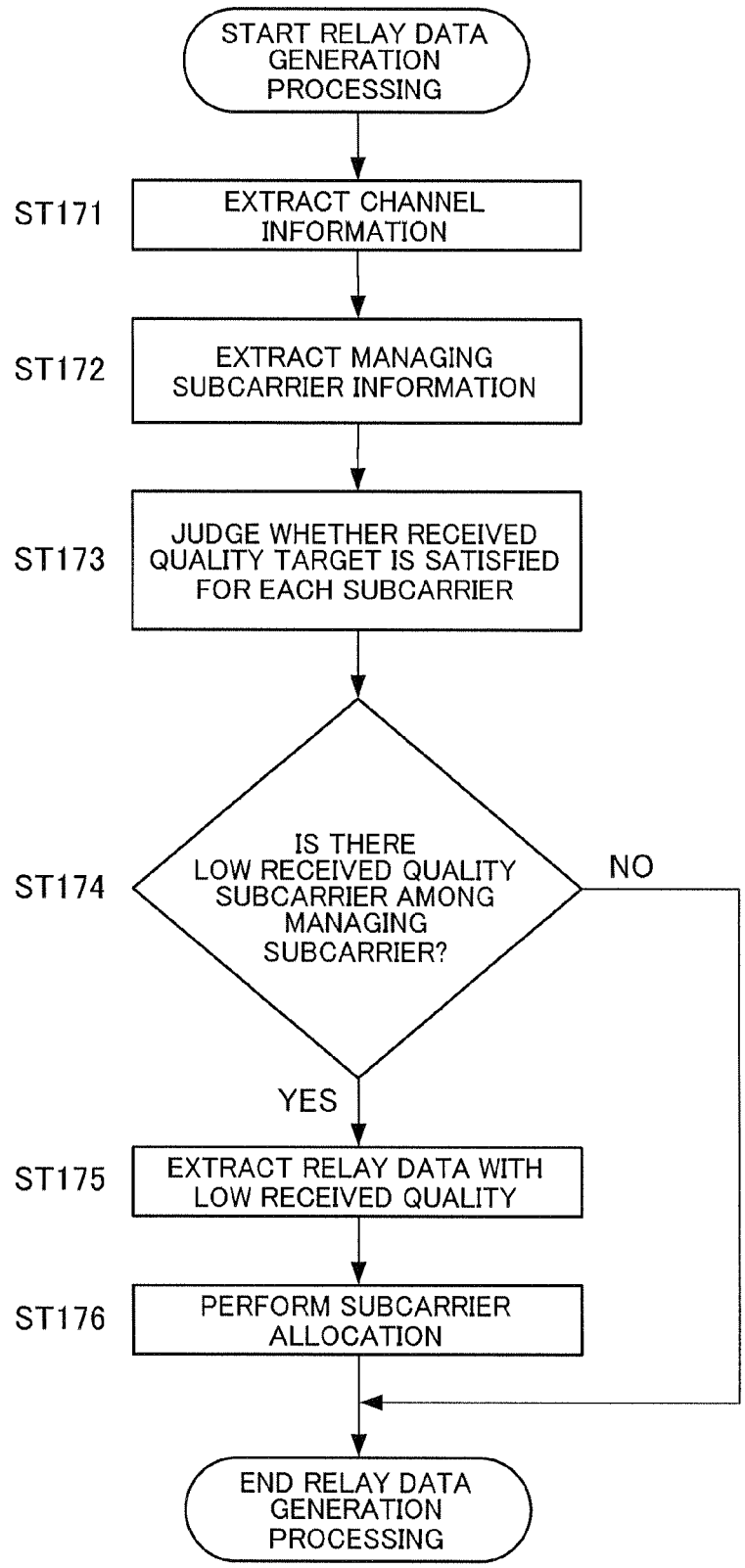
FIG. 21 is a flow chart for a relay processing of the relay station apparatus according to embodiment 3.

Next, the flow of the relay processing according to the present embodiment will be described using FIG. 21.

First, in ST (step) 171, channel information extraction section 31 carries out processing to extract channel information.

In ST172, managing subcarrier information extraction section 72 carries out processing to extract subcarrier information which is managed locally.

In ST173, subcarrier selection section 71 judges, from the channel information, whether the received quality for each subcarrier is low (whether the received intensity level is less than a target received intensity level), and selects the subcarrier with low received quality. Then, in ST174, it is judged whether among the managing subcarriers there are subcarriers of low received quality. When there are no subcarriers with low received quality in ST174, the relay data generation processing is ended. On the other hand, if there is a subcarrier with low received quality in ST174, the flow proceeds to ST175.

In ST175, relay data extraction section 33 carries out an extraction processing to extract, from the signals addressed to mobile station apparatus 100, a signal allocated to the subcarrier selected in ST173.

In ST176, subcarrier allocation section 35 carries out an allocation processing to allocate relay data extracted in ST175 to the same subcarrier as the subcarrier to which this relay data was allocated at the time of transmission from base station apparatus 200.

Thus, in the present embodiment, since relaying is carried out by a plurality of relay station apparatuses, the transmission power for one relay station apparatus can be further reduced.

The managing subcarrier to be relayed may be set by base station apparatus 200 or an upper level control station apparatus and reported to both relay station apparatuses 170-1 and 170-2, or may be set by mobile station apparatus 100 and reported to both relay station apparatuses 170-1 and 170-2. Also, the managing subcarriers may be set as fixed, or the received quality at relay station apparatus 170-1 and the received quality at relay station apparatus 170-2 may be compared for each subcarrier, and the apparatus with the higher received quality for each subcarrier may be set as the managing apparatus.

Also, the respective relay station apparatuses may carry out transmission at separate timings, instead of in synchronization, during the relay by the respective relay station apparatuses.

Also, as shown in embodiment 2, the subcarriers at the time of relaying may be replaced by subcarriers with high received quality.

Embodiment 4

The present embodiment shows an example in which a plurality of relay station apparatuses carry out relay, and at least one relay station apparatus from amongst this plurality of relay station apparatuses relays all the subcarriers received from the base station apparatus, and the other relay station apparatuses supplementarily relay part of the subcarriers with low received quality in the mobile station apparatus.

Figure 22:
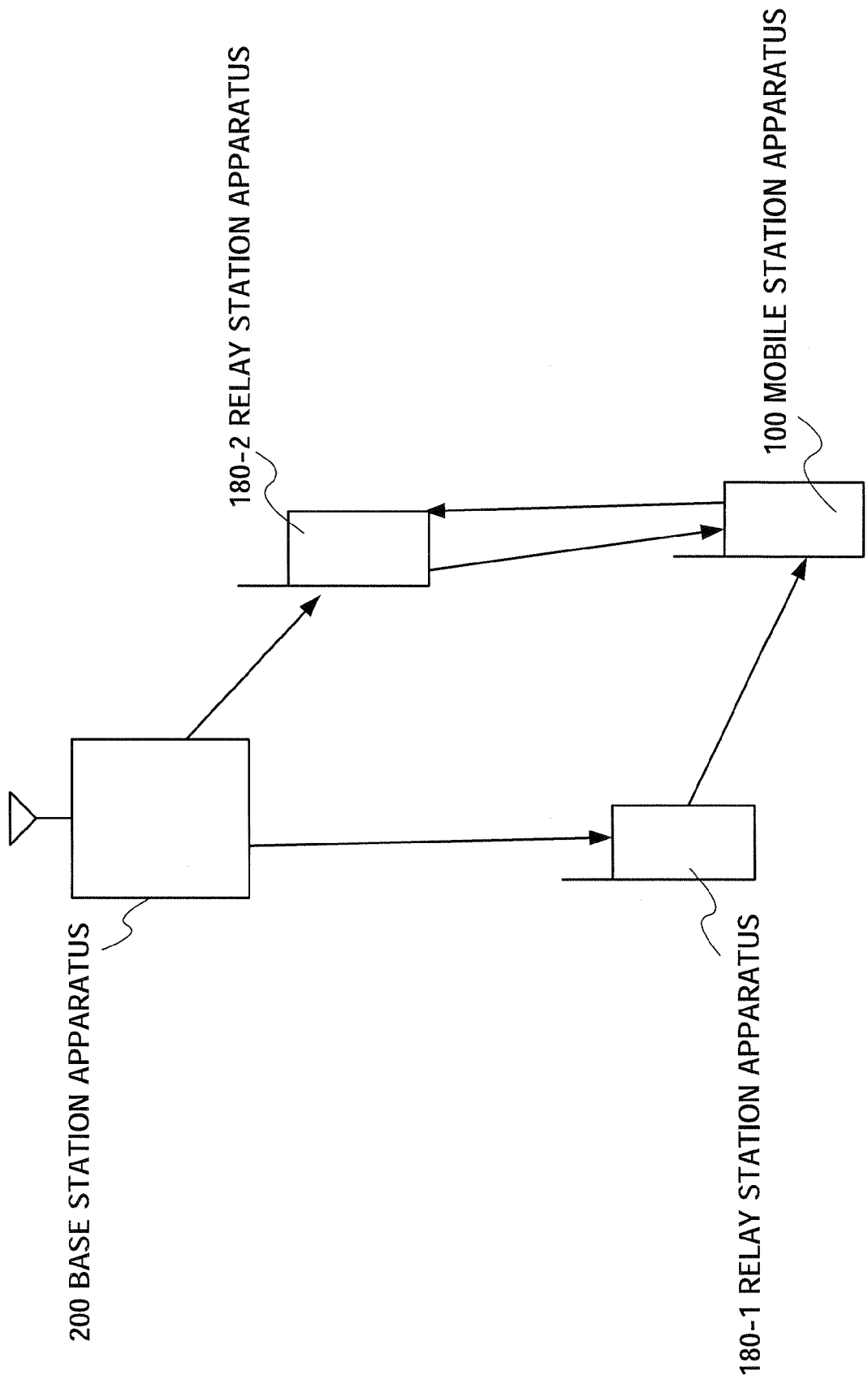
FIG. 22 is a configuration diagram of a mobile communication system according to embodiment 4.

As shown in FIG. 22, a mobile communication system according to the present embodiment is comprised of mobile station apparatus 100, a plurality of relay station apparatuses 180-1 and 180-2, and base station apparatus 200.

Next, the overall processing will be described using the sequence diagram shown in FIG. 23.

Base station apparatus 200 transmits a signal of frame 1 to relay station apparatus 180-1 and relay station apparatus 180-2 (processings (1) and (2)). Relay station apparatus 180-1 and 180-2 simultaneously relay the signal of frame 1 received from base station apparatus 200, to mobile station apparatus 100 (processings (3) and (4)) Mobile station apparatus 100 transmits the channel information of the signal from relay station 180-1 in mobile station apparatus 100 to relay station 180-2 (processing (5)). Next, base station apparatus 200 transmits the signal of frame 2 to relay station apparatus 180-1 and relay station apparatus 180-2 (processings (6) and (7)). Relay station apparatus 180-1 transmits the signal of frame 2 to mobile station apparatus 100 (processing (8)). Relay station apparatus 180-2 transmits only the subcarrier with low received quality to mobile station apparatus 100, in accordance with the channel information between relay station apparatus 180-1 and mobile station apparatus 100 in frame 1 (processing (9)).

Next, an example showing the received intensity level of the received signal by mobile station apparatus 100 and relay station apparatuses 180-1 and 180-2 is illustrated in FIGS. 24A to F. Similar to the embodiment 1, the received intensity level is used as received quality.

Figure 23:
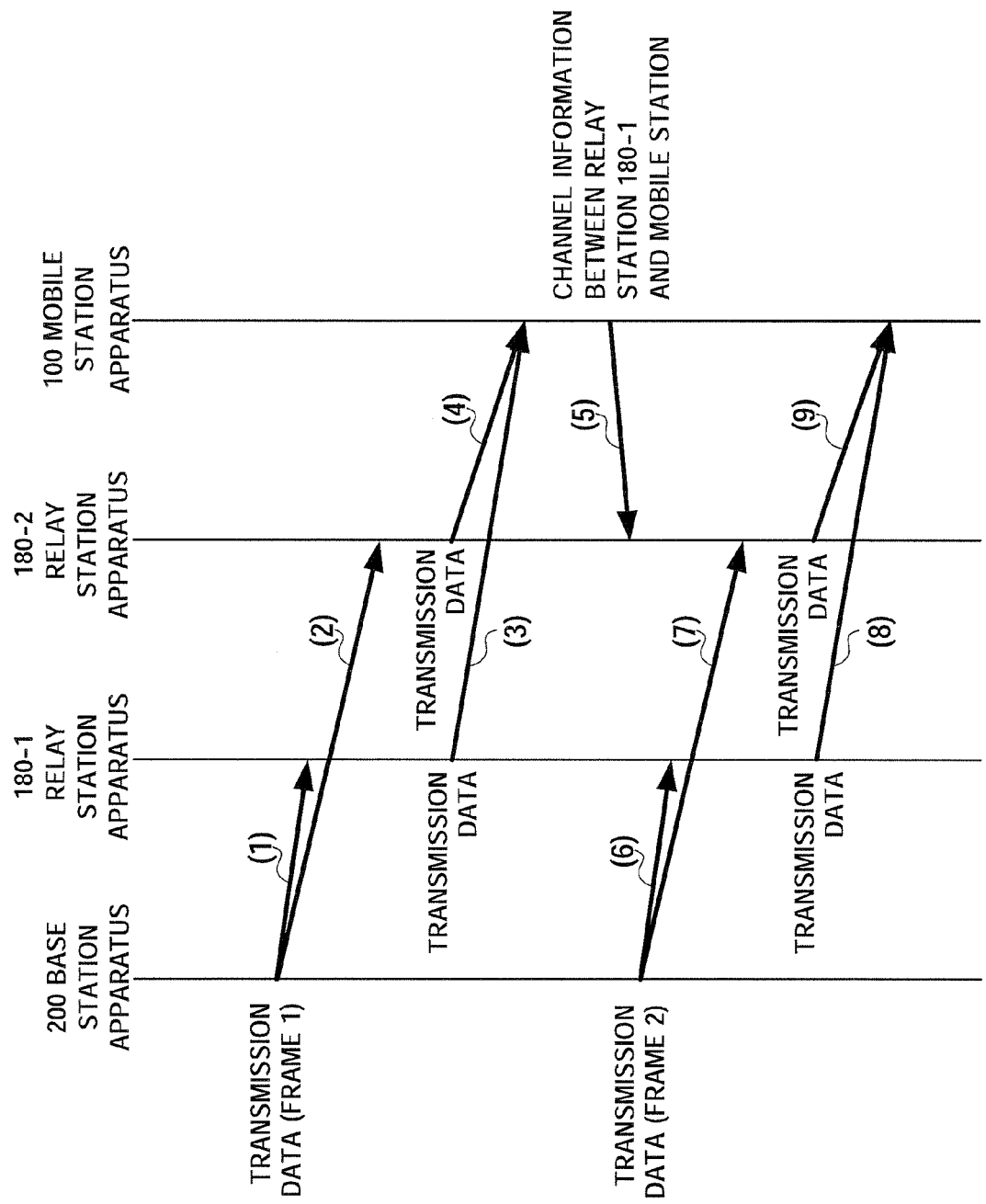
FIG. 23 is a sequence diagram according to embodiment 4.
Figure 24A:
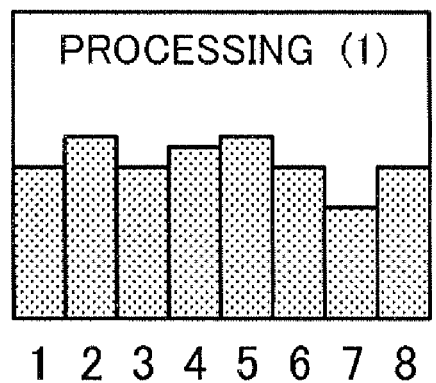
FIG. 24A is a diagram showing an example of a received intensity level for each subcarrier, according to embodiment 4.
Figure 24B:
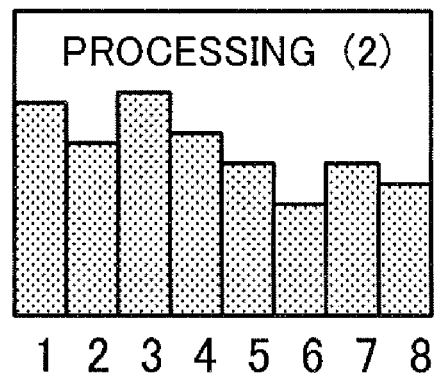
FIG. 24B is a diagram showing an example of a received intensity level for each subcarrier, according to embodiment 4.
Figure 24C:
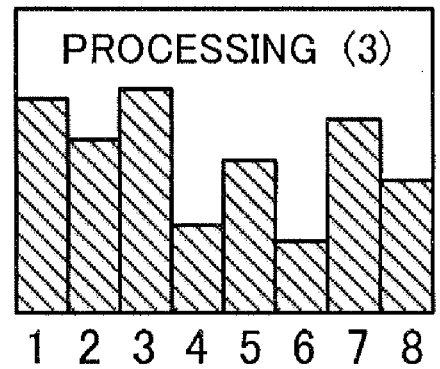
FIG. 24C is a diagram showing an example of a received intensity level for each subcarrier, according to embodiment 4.
Figure 24D:
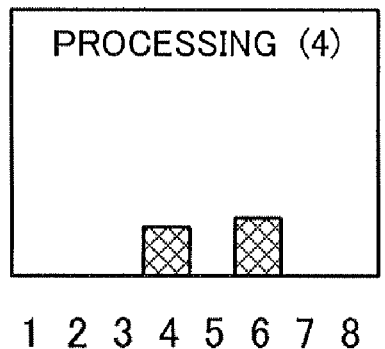
FIG. 24D is a diagram showing an example of a received intensity level for each subcarrier, according to embodiment 4.
Figure 24E:
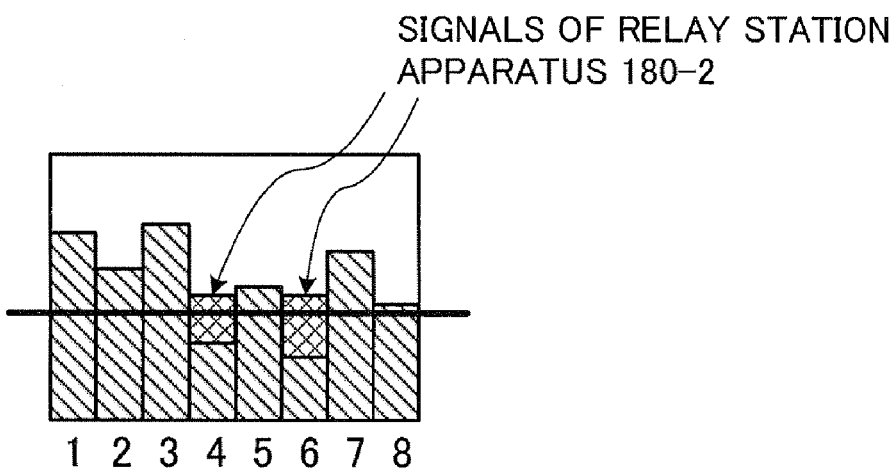
FIG. 24E is a diagram showing an example of a received intensity level for each subcarrier, according to embodiment 4.
Figure 24F:
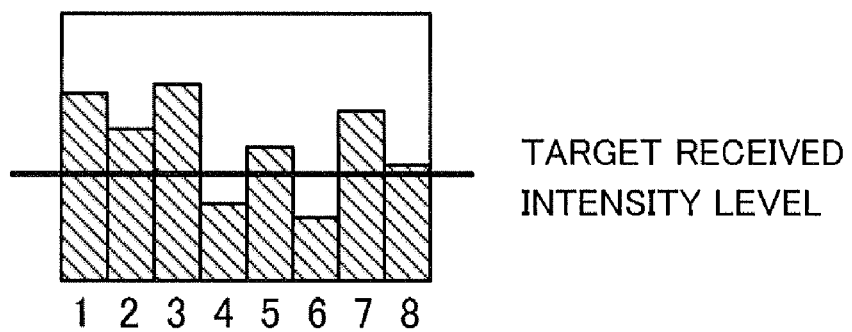
FIG. 24F is a diagram showing an example of a received intensity level for each subcarrier according to embodiment 4.

FIG. 24A shows the received intensity level for each subcarrier in relay station apparatus 180-1, of the signal transmitted by base station apparatus 200 in processing (1) of FIG. 23; FIG. 24B shows the received intensity level for each subcarrier in relay station apparatus 180-2, of the signal transmitted by base station apparatus 200 in processing (2) of FIG. 23; FIG. 24C shows the received intensity level in mobile station apparatus 100, of the signal transmitted from relay station apparatus 180-1 in processing (3) in FIG. 23; FIG. 24D shows the received intensity level in mobile station apparatus 100, of the signal transmitted from relay station apparatus 180-2 in processing (4) of FIG. 23; FIG. 24E shows the received intensity level at the time mobile station apparatus 100 receives the signal from relay station apparatus 180-1 and the signal from relay station apparatus 180-2; and FIG. 24F shows the received intensity level at the time the mobile station apparatus 100 receives only the relay signal of relay station apparatus 180-1, respectively.

As shown in FIG. 24E, if mobile station apparatus 100 receives the signal from relay station apparatus 180-1 and the signal from relay station apparatus 180-2, the received intensity of the signal from relay station apparatus 180-2 is included in the received intensity, and it is impossible to accurately judge which subcarrier, from the signal of relay station apparatus 180-1 which carries out relaying of all subcarriers, has poor received quality. Therefore, in the present embodiment, the received quality of relay station apparatus 180-1 only, as shown in FIG. 24F, is measured as channel information to be received in processing (5) of FIG. 23. To carry out this measurement, two types of pilot signals are generated. One pilot is a pilot not multiplexed with the relay signal from relay station apparatus 180-2 multiplexed with, and the other pilot is a pilot the relay signal from relay station apparatus 180-2.

Figure 25:
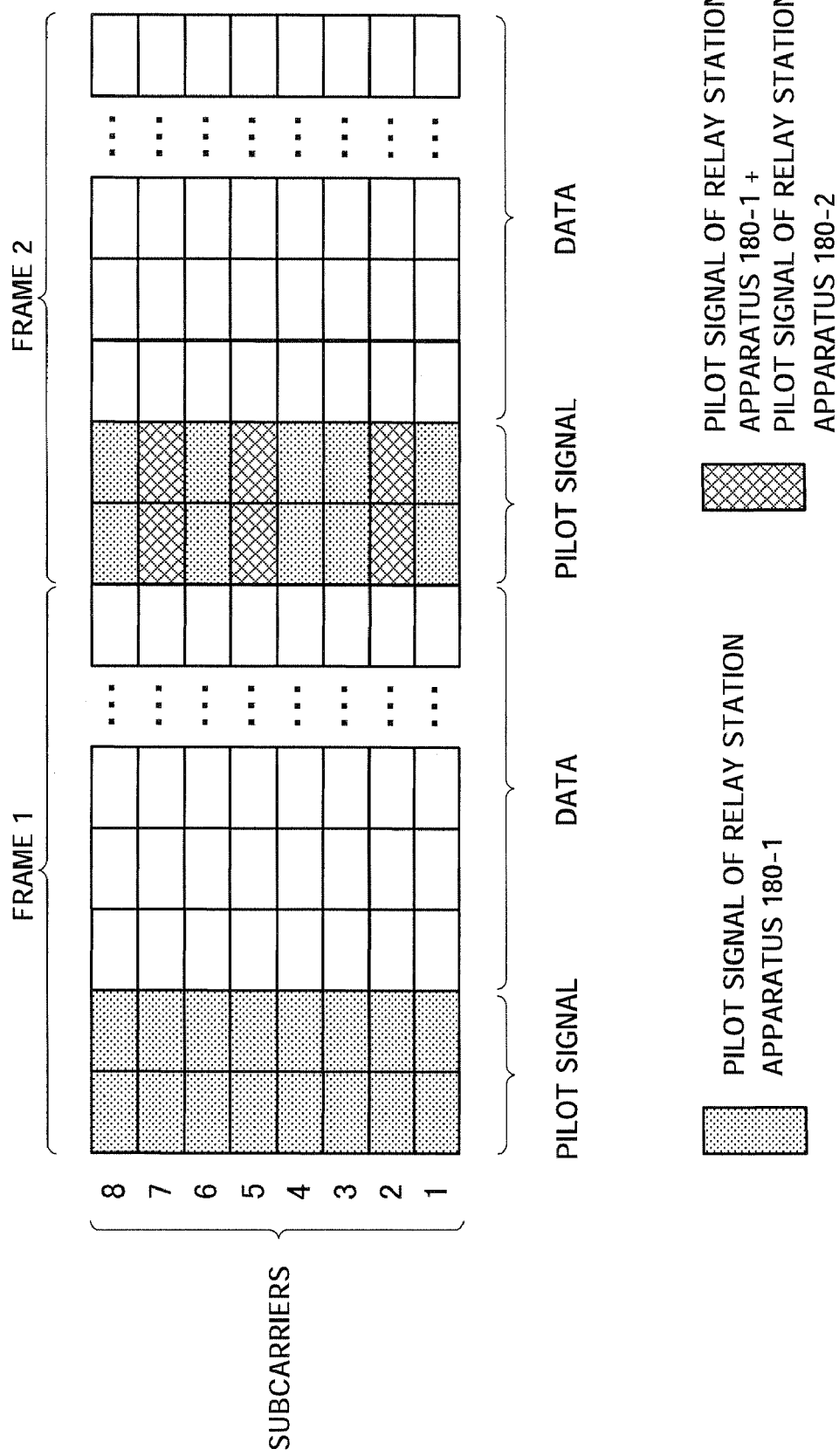
FIG. 25 is a diagram showing a pilot signal according to embodiment 4.

FIG. 25 shows the two types of pilot signals according to the present embodiment. In this figure, the pilot of the relay signal of relay station apparatus 180-2 is not multiplexed in the first frame of the pilot, and the pilot of the relay signal of relay station apparatus 180-2 is multiplexed in the pilot of the second frame, only for the subcarrier that transmits the relay signal of relay station apparatus 180-2. Mobile station apparatus 100 generates, from the pilot of the first frame, the channel information between relay station apparatus 180-1 and mobile station apparatus 100, to be received in processing (5) of FIG. 23. Also, mobile station apparatus 100 carries out channel estimation in mobile station apparatus 100 by using the pilot of the second frame.

Figure 26:
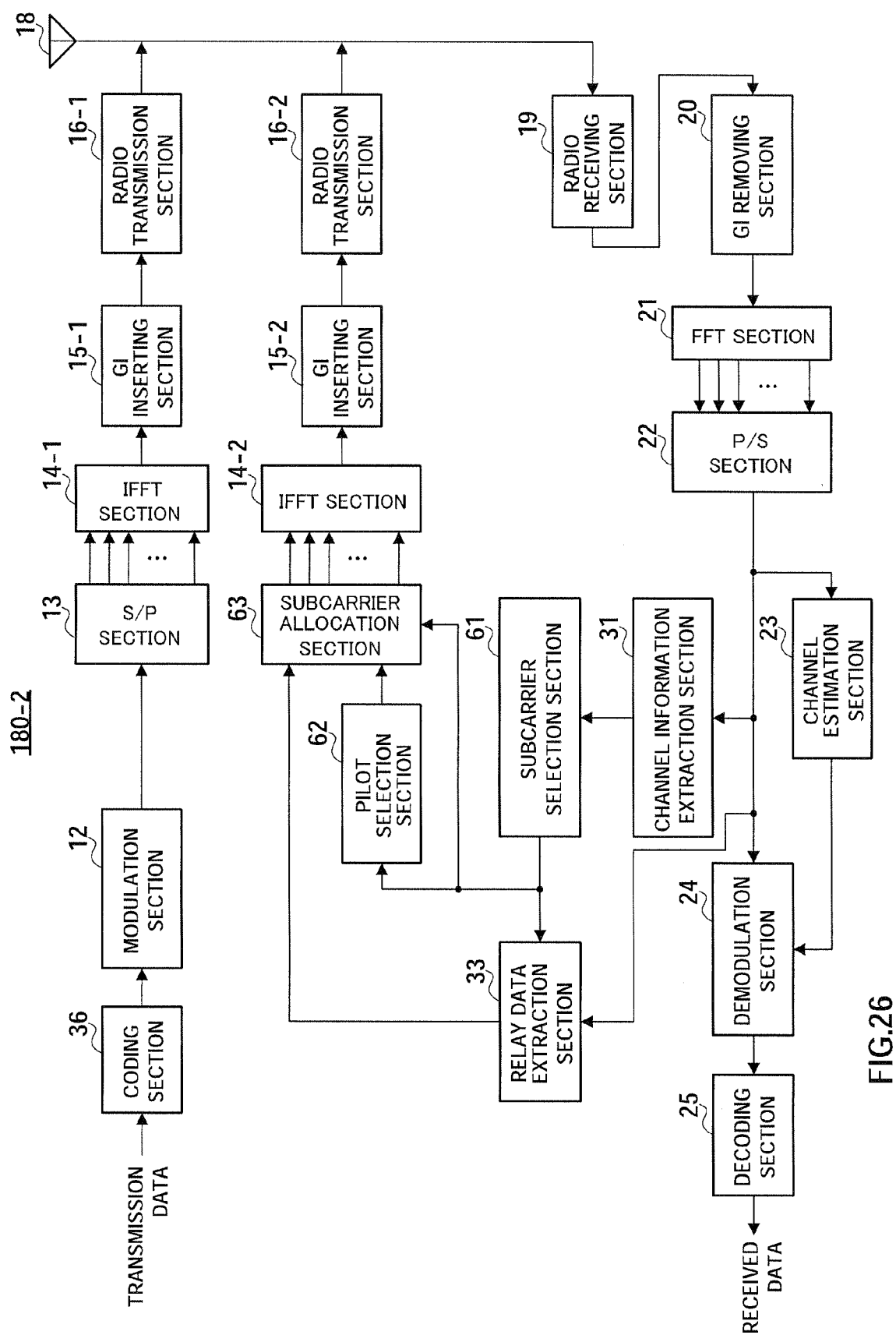
FIG. 26 is a block diagram showing a configuration of a relay station apparatus according to embodiment 4.

Next, the configuration of relay station apparatus 180-2 that carries out supplementary relaying will be described. FIG. 26 shows a block diagram illustrating the configuration of relay station apparatus 180-2 according to the present embodiment. Elements which are the same as those of FIG. 6 are designated by the same numerical symbols, and description thereof is hereby omitted.

Subcarrier selection section 61 selects a subcarrier with low received quality, in accordance with the channel information, and inputs the number of the selected subcarrier to relay data extraction section 33, pilot selection section 62 and subcarrier allocation section 63. Pilot selection section 62 selects whether or not to insert the pilot signal at a predetermined period or predetermined timing. When the pilot signal is to be inserted, the pilot signal is inputted to subcarrier allocation section 63.

Figure 27:
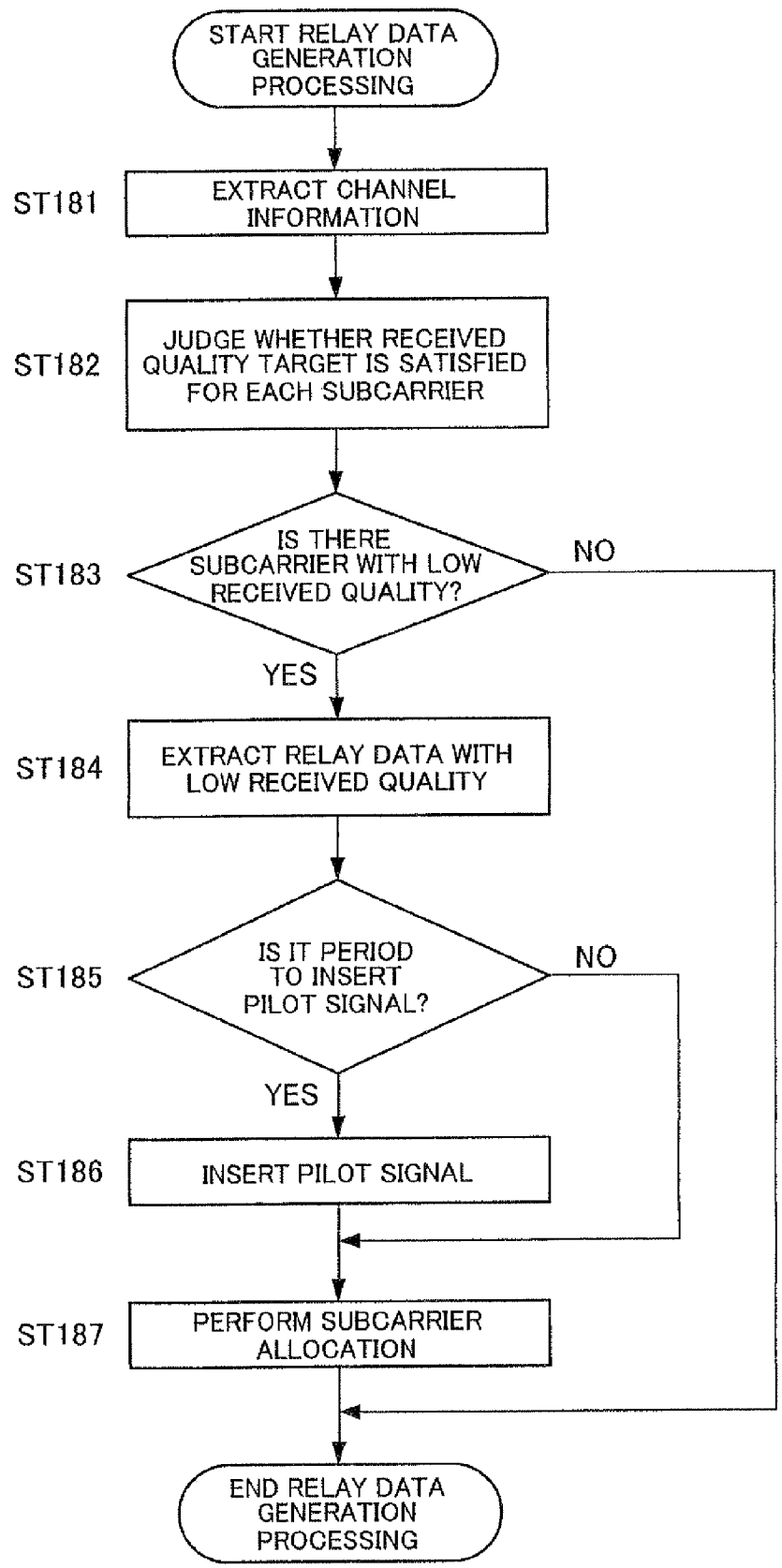
FIG. 27 is a flow chart for a relay processing of the relay station apparatus according to embodiment 4.

Next, a flow of the relay processing according to the present embodiment is described using FIG. 27.

First, in ST (step) 181, channel information extraction section 31 carries out extraction processing of channel information.

In ST182, subcarrier selection section 61 judges, from the channel information, whether the received quality for each subcarrier is low (whether the received intensity level is less than a target received intensity level), and selects the subcarrier with low received quality. Then, in ST183, it is judged whether there is a subcarrier which has low received quality. When there is no subcarrier with low received quality in ST183, the relay data generation processing is ended. On the one hand, if there is a subcarrier with low received quality in ST183, the flow proceeds to ST184.

In ST184, relay data extraction section 33 carries out extraction processing to extract a signal allocated to the subcarrier selected in ST182, from the signal addressed to mobile station apparatus 100.

In ST185, pilot selection section 62 judges whether it is the period to insert the pilot signal, and if it is the period to insert the pilot signal, the flow proceeds to ST186, and the pilot signal is inserted to the subcarrier that is to be relay-transmitted. On the one hand, When it is not the period to insert the pilot signal in ST185, the flow proceeds to ST187.

In ST187, subcarrier allocation section 63 carries out allocation processing to allocate the pilot signal and relay data extracted in ST184 to the subcarrier.

In this way, in the present embodiment, since mobile station apparatus 100 receives both a pilot signal that is multiplexed with the relay signal from relay station apparatus 180-2 and a pilot signal that is multiplexed with the relay signal, mobile station apparatus 100 can estimate the received quality of relay station apparatus 180-1. Therefore, since the subcarrier to be relayed can be limited to the subcarrier with low received quality in mobile station apparatus 100, of the signal from relay station apparatus 180-1, the transmission power of relay station apparatus 180-2 can be reduced compared to the case of relaying all subcarriers.

In the case of TDD-OFDM, since relay station apparatus 180-1 and 180-2 can estimate the received quality between relay station apparatuses 180-1 and 180-2 and mobile station apparatus 100, from the uplink received quality from mobile station apparatus 100, the pilot needs not be used as described in the present embodiment.

Figure 28:
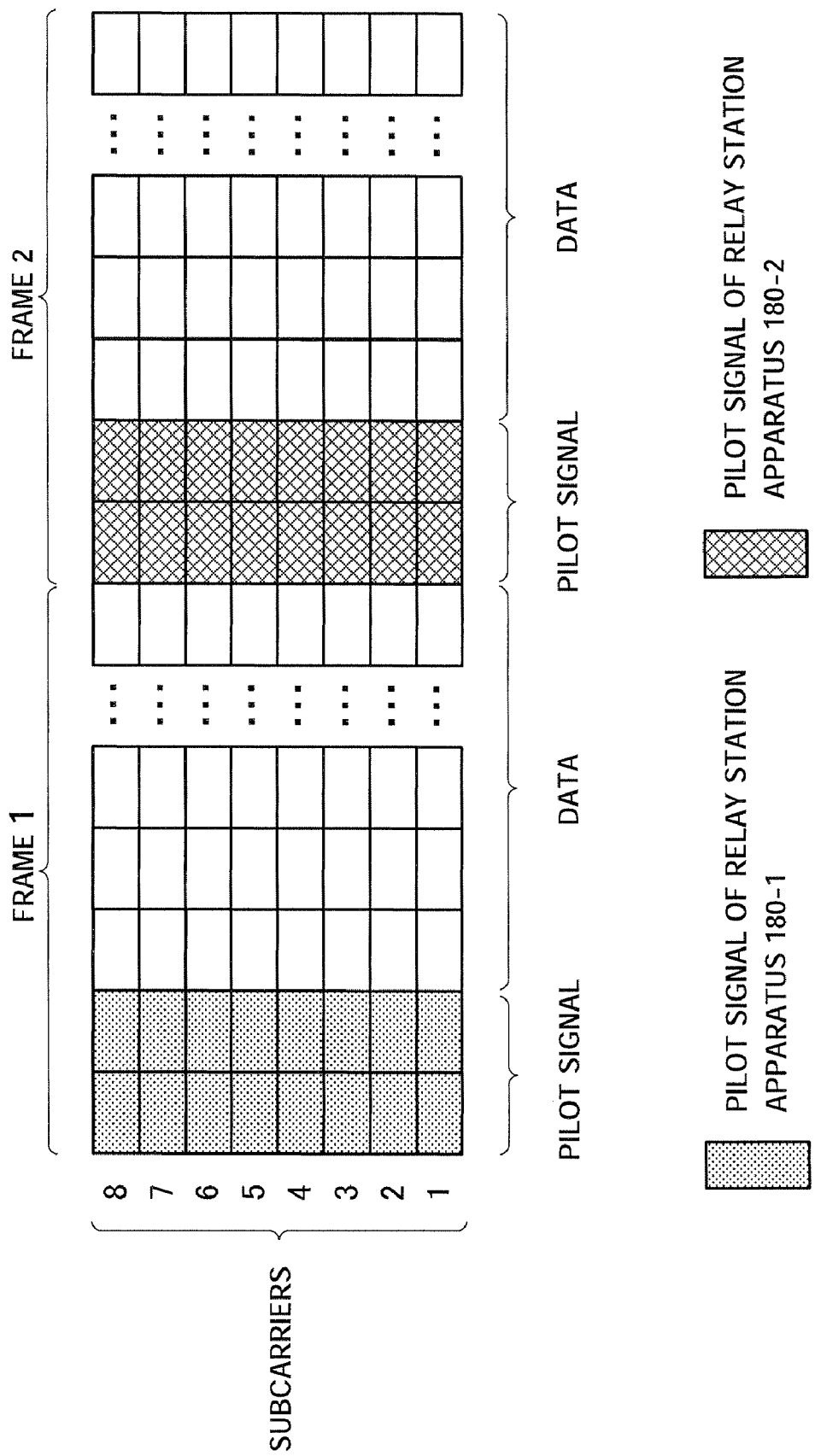
FIG. 28 is a diagram showing a pilot signal according to embodiment 4.

Also, as shown in FIG. 28, in the portion where the pilot of relay station apparatus 180-1 and the pilot of relay station apparatus 180-2 are multiplexed and transmitted, the pilot of the relay station apparatus 180 alone may be transmitted. In this case, relay station apparatus 180-1 and relay station apparatus 180-2 can obtain channel information for each relay station apparatus.

Also, relay station apparatus 180-2 is not limited to one mobile station apparatus but may include a plurality of mobile station apparatuses.

Also, the multiplexing of the pilot signal may be carried out every several symbols within a frame, or may be switched every several frames.

In the above-described embodiments, an example has been described in which the relay station apparatus carries out direct communication with the base station apparatus. However, it is not limited to this, and another relay station apparatus may further be provided between the relay station apparatus and the base station apparatus.

Also, an example has been described in which the first communication apparatus is a base station apparatus, and the second communication apparatus is a mobile station apparatus. However, the first communication apparatus may be a mobile station apparatus and the second communication apparatus may be a base station apparatus, or the first communication apparatus and the second communication apparatus may be both mobile station apparatuses.

Also, the base station apparatus, the relay station apparatus and the mobile station apparatus may have their respective power controlled.

Also, in the above-described embodiments, an example has been described of a case where the present invention is configured by hardware. However, the present invention can also be realized by software.

Each function block employed in the description of each of the aforementioned embodiments may typically be implemented as an LSI constituted by an integrated circuit. These may be individual chips or partially or totally contained on a single chip. "LSI" is adopted here but this may also be referred to as "IC", "system LSI", "super LSI", or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application in biotechnology is also possible.

The present application is based on Japanese Patent Application No. 2004-285468, filed on Sep. 29, 2004, the entire content of which is expressly incorporated by reference herein.

INDUSTRIAL APPLICABILITY

The radio communication apparatus according to the present invention provides an advantage of suppressing an increase of power consumption when a signal is relayed from a first radio communication apparatus to a second radio communication apparatus, and is suitable for use in systems involving relaying operations, such as multihop systems or the like.

The invention claimed is:

1. A radio communication apparatus comprising:
a receiving section configured to receive, from a first radio communication apparatus, a first multicarrier signal comprising a plurality of subcarriers;
a subcarrier selection section configured to select a part of the plurality of subcarriers;
an extraction section configured to extract, from the first multicarrier signal, a subcarrier signal allocated to the part of the plurality of subcarriers, in accordance with a selection result in the subcarrier selection section;
a generation section configured to generate a second multicarrier signal including the subcarrier signal; and
a transmission section configured to transmit the second multicarrier signal to a second radio communication apparatus, wherein:
the subcarrier selection section is configured to select a subcarrier having a lower received quality at the second radio communication apparatus than a predetermined quality.

2. The radio communication apparatus according to claim 1, wherein the generation section is configured to allocate the subcarrier signal to a subcarrier included in the second multicarrier signal using a mapping that is the same as a mapping of the first multicarrier signal.

3. The radio communication apparatus according to claim I, wherein the generation section is configured to allocate the subcarrier signal to a subcarrier having a higher received quality at the second radio communication apparatus than a predetermined quality.

4. The radio communication apparatus according to claim 1, wherein:
the selection section is configured to select the part of the plurality of subcarriers in a plurality of frames;
the extraction section is configured to extract subcarrier signals allocated to the part of the plurality of subcarriers in the plurality of frames; and
the generation section is configured to allocate the subcarrier signals extracted from the plurality of frames, to subcarriers which differ from one another.

5. The radio communication apparatus according to claim 1, wherein the subcarrier selection section is configured to select the part of the plurality of subcarriers from a managing subcarrier.

6. The radio communication apparatus according to claim 1, wherein the transmission section is configured to transmit the second multicarrier signal in synchronization with a third radio communication apparatus comprising the first radio communication apparatus and the second radio communication apparatus.

7. The radio communication apparatus according to claim 1, further comprising a pilot selection section configured to determine whether or not to insert a pilot signal into the second multicarrier signal at a predetermined period or a predetermined timing.

8. A radio communication method comprising:
receiving, from a first radio communication apparatus, a first multicarrier signal comprising a plurality of subcarriers;
selecting a part of the plurality of subcarriers;
extracting, from the first multicarrier signal, a subcarrier signal allocated to the part of the plurality of subcarriers, in accordance with a subcarrier selection result of the selecting;
generating a second multicarrier signal including the subcarrier signal; and
transmitting the second multicarrier signal to a second radio communication apparatus, wherein:
the selecting of the part of the plurality of subcarriers comprises selecting a subcarrier having a lower received quality at the second radio communication apparatus than a predetermined quality.

9. A radio communication system comprising:
a first radio communication apparatus configured to transmit a first multicarrier signal comprising a plurality of subcarriers; and
a second radio communication apparatus and a third radio communication apparatus configured to receive the first multicarrier signal, wherein:
the third radio communication apparatus is configured to select a part of the plurality of subcarriers, extract a subcarrier signal allocated to the part of the plurality of subcarriers from the first multicarrier signal, generate a second multicarrier signal including the subcarrier signal, and transmit the second multicarrier signal to the second radio communication apparatus;
the second radio communication apparatus is configured to combine the first multicarrier signal and the second multicarrier signal; and
the third radio communication apparatus is configured to select a subcarrier having a lower received quality at the second radio communication apparatus than a predetermined quality.

\* \* \* \* \*

UNITED STATES PATENT AND TRADEMARK OFFICE
CERTIFICATE OF CORRECTION

| | |
|---|---|
| PATENT NO. | : 8,073,061 B2 |
| APPLICATION NO. | : 11/576133 |
| DATED | : December 6, 2011 |
| INVENTOR(S) | : Ayako Horiuchi et al. |

It is certified that error appears in the above-identified patent and that said Letters Patent is hereby corrected as shown below:

Claim 3, column 18, line 50, incorrectly reads:

"I, wherein the generation section is configured to allocate the"

and should read:

"1, wherein the generation section is configured to allocate the"

Signed and Sealed this
Nineteenth Day of June, 2012

David J. Kappos
*Director of the United States Patent and Trademark Office*